United States Patent
Ely et al.

(10) Patent No.: US 9,526,032 B2
(45) Date of Patent: Dec. 20, 2016

(54) NETWORK BANDWIDTH SHARING FOR SMALL MOBILE DEVICES

(71) Applicant: Apple Inc., Cupertino, CA (US)

(72) Inventors: Colin M. Ely, Sunnyvale, CA (US); Fletcher R. Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/659,930

(22) Filed: Mar. 17, 2015

(65) Prior Publication Data

US 2016/0095017 A1    Mar. 31, 2016

Related U.S. Application Data

(60) Provisional application No. 62/056,297, filed on Sep. 26, 2014.

(51) Int. Cl.
*H04W 72/00* (2009.01)
*H04W 28/20* (2009.01)
(Continued)

(52) U.S. Cl.
CPC .......... *H04W 28/20* (2013.01); *H04L 61/6022* (2013.01); *H04W 4/001* (2013.01);
(Continued)

(58) Field of Classification Search
CPC ........ H04W 28/20; H04W 12/06; H04W 4/24; H04W 4/008; H04W 16/14; H04W 76/025; H04L 61/6022
(Continued)

(56) References Cited

U.S. PATENT DOCUMENTS

2009/0046591 A1* 2/2009 Krishnaswamy ..... H04L 63/029 370/252
2009/0047966 A1* 2/2009 Krishnaswamy ..... H04L 63/029 455/442

(Continued)

FOREIGN PATENT DOCUMENTS

CN    103857013 A    6/2014
EP    2031919 A1     3/2009
(Continued)

OTHER PUBLICATIONS

International Search Report and Written Opinion mailed Oct. 13, 2015 in PCT/US2015/042367, 9 pages.

*Primary Examiner* — Tanmay Shah
(74) *Attorney, Agent, or Firm* — Kilpatrick Townsend & Stockton LLP; David B. Raczkowski

(57) ABSTRACT

Client devices with wireless functionality, but without wide area network or cellular network functionality, can obtain network access via a host device, where the host device has network access. Such network access can be obtained when a client device of a user is in local range of a host device, e.g., of a different user. The host device may enable network bandwidth sharing with settings that specify a threshold of resource usage (e.g., battery or bandwidth limit). An authentication process can confirm that either one or both of a client device and a host device are registered for the network bandwidth sharing. A server can monitor the amount of resources shared by the host device, and manage incentives to the user of the host device.

21 Claims, 11 Drawing Sheets

(51) Int. Cl.
*H04L 29/12* (2006.01)
*H04W 4/24* (2009.01)
*H04W 12/06* (2009.01)
*H04W 16/14* (2009.01)
*H04W 76/02* (2009.01)
*H04W 12/08* (2009.01)
*H04W 88/04* (2009.01)
*H04W 4/00* (2009.01)
*H04W 4/02* (2009.01)

(52) U.S. Cl.
CPC ............ *H04W 4/24* (2013.01); *H04W 12/06* (2013.01); *H04W 12/08* (2013.01); *H04W 16/14* (2013.01); *H04W 76/025* (2013.01); *H04W 88/04* (2013.01); *H04W 4/008* (2013.01); *H04W 4/02* (2013.01); *H04W 4/027* (2013.01); *H04W 4/028* (2013.01)

(58) Field of Classification Search
USPC .......................................................... 455/454
See application file for complete search history.

(56) References Cited

U.S. PATENT DOCUMENTS

| | | |
|---|---|---|
| 2011/0294502 A1 | 12/2011 | Oerton |
| 2012/0084187 A1 | 4/2012 | Sperling et al. |
| 2012/0210001 A1 | 8/2012 | Ryerson et al. |
| 2014/0233458 A1 | 8/2014 | Georgescu et al. |

FOREIGN PATENT DOCUMENTS

| | | |
|---|---|---|
| EP | 2034779 A1 | 3/2009 |
| EP | 2 424 308 B1 | 3/2013 |

* cited by examiner

US 9,526,032 B2

NETWORK BANDWIDTH SHARING FOR SMALL MOBILE DEVICES

CROSS REFERENCE TO RELATED APPLICATIONS

The present application claims the benefit of U.S. Provisional Application No. 62/056,297, filed Sep. 26, 2014, which is hereby incorporated by reference in its entirety for all purposes.

FIELD

The disclosure relates to communications among devices, including providing network access to a mobile device of one user via a host device of a second user.

BACKGROUND

With the continuing proliferation of different types of networked devices, a single user that in the past may have had only one computer or one phone may now have a desktop computer, a laptop computer, a mobile phone, a tablet, networked wearable devices, networked home appliances, and other networked devices. Managing communications in such an environment is an increasingly complex task. Smaller mobile devices in particular may not have the power or hardware resources for network connectivity to much of the existing wireless network infrastructure. And, a user may not always carry a network-connected device with them.

BRIEF SUMMARY

Embodiments provide systems, methods, and apparatuses for use in providing network access by a host device to a client device. In some embodiments, the host device may be owned by a first user and the client device may be owned by a second user. For example, the client device may have wireless functionality (e.g., for peer-to-peer connections), but not have functionality or a service provider for network access (e.g., to the Internet). Such network access can be obtained when a client device of a first user is in local range of a host device, e.g., of a second user.

The host device may enable network bandwidth sharing with settings that specify a threshold of resource usage (e.g., battery or bandwidth limit). An authentication process can confirm that either one or both of a client device and a host device are registered for the network bandwidth sharing with a server. A server can monitor the amount of resources shared by the host device, and manage incentives to a user of the host device.

Other embodiments are directed to systems, portable consumer devices, and computer readable media associated with methods described herein.

A better understanding of the nature and advantages of embodiments of the present invention may be gained with reference to the following detailed description and the accompanying drawings.

DETAILED DESCRIPTION

Figure 1:
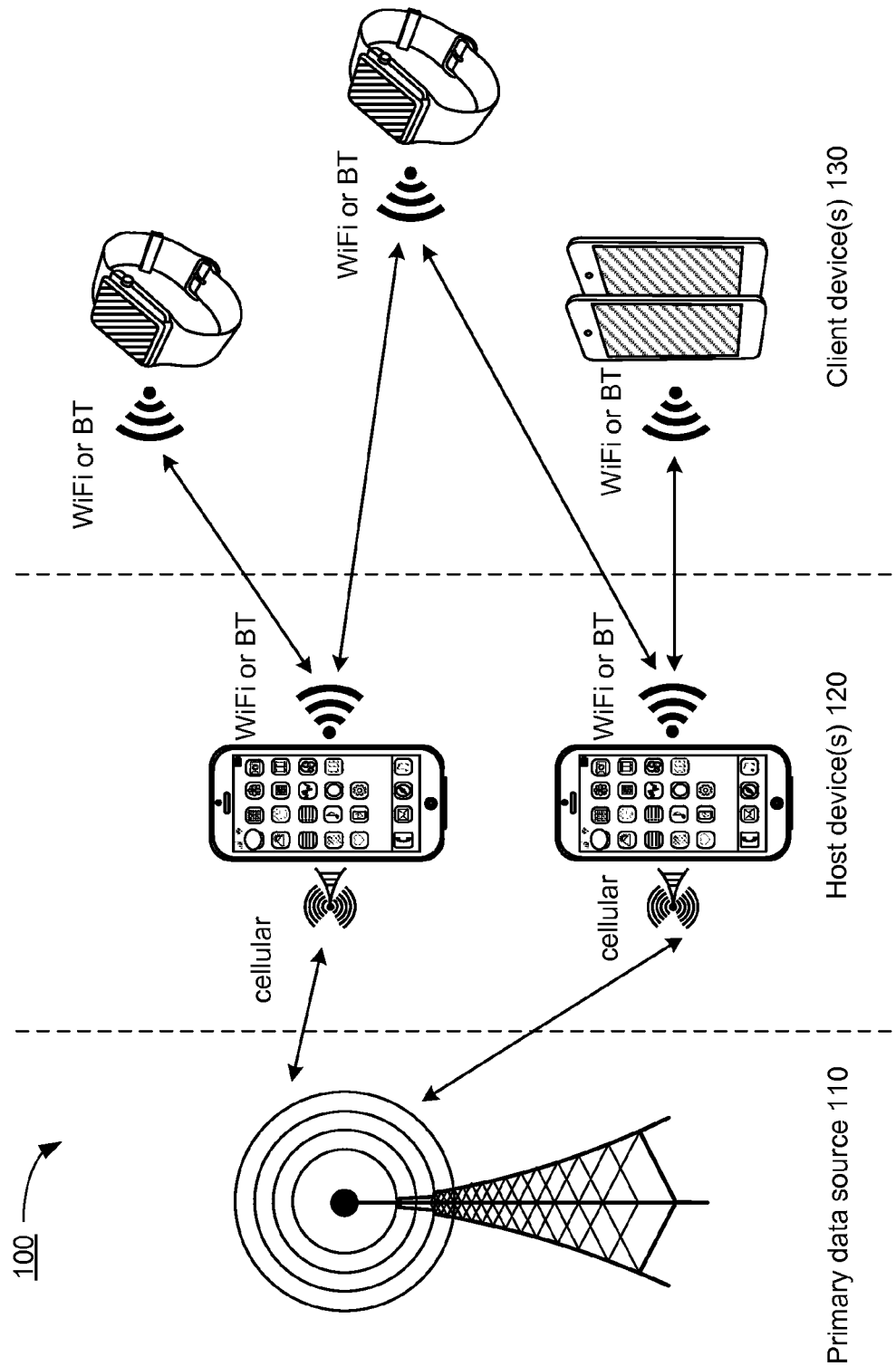
FIG. 1 shows an example system 100 illustrating implementation of network bandwidth sharing (also called "data sharing") to provide network access to client devices without WAN functionality.

Embodiments can use host devices (e.g., smartphones) to provide network access (e.g., cellular data service) to electronic devices (e.g., smart watches and music players). Embodiments can be particularly suited for providing such network access from a host device of a different user than the electronic device. In this manner, the electronic device can obtain network access as a client device, as long as the electronic device is near a host device, e.g., near other people who have their phones with them. In some embodiments, limited or no configuration may be required at the electronic device.

Host devices that include the WAN functionality may include user settings for automatically sharing network resources with unrelated electronic devices. Such user settings may enable incentives or user rewards for sharing the resource of network bandwidth. In some embodiments, a user can specify how much bandwidth sharing to provide to a client device of another person. For example, the user settings may provide limits on the amount bandwidth or data to share. The settings may be based on the host device's available bandwidth, monthly data limits, or other such resource limitations of the host device.

I. Devices for Network Bandwidth Sharing

Certain types electronic devices often do not have cellular data service, or other wide area network (WAN) service, that operates effectively or seamlessly as a user moves from location to location. In many cases, this is due to size and/or power restrictions on such devices. The antennas for such services are larger than the antennas for local area network (LAN) or near field connections provided by WiFi, Bluetooth™ (BT), or other such short range communication systems. The additional costs and size of WAN network chipsets and WAN service providers also can discourage inclusion of this functionality in some electronic devices. Rather than integrating such functionality with certain types of electronic devices, e.g., small devices, embodiments can use LAN functionality of a connectivity-limited electronic device to enable network communication via a host device. Thus, the small electronic device can act as a client device in obtaining network access from the host device.

In some embodiments, with a sufficient coverage of host devices, a client device may have regular access to network communications (e.g., with network communication handoffs between host devices managed by a centralized system), as a small device moves out of range of one host device and into range of another host device. The network communication can occur in an automatic and secure fashion even though the users of the host device and the small electronic device are different.

A client device refers to devices that receive the benefit of network bandwidth shared by a host device. Examples of such devices include smart watches, music players such as iPod™ devices, LAN-only health monitors, and other such devices with LAN functionality.

A host device refers to any device with both WAN and LAN functionality that may be configured to provide network access to a client device, including to a client device that is not associated with a user of the host device. Smartphones are one example of such a host device. Mobile access points (AP) with WAN and LAN functionality, laptop computers, or other such devices may also function as host devices.

A. System of Sources, Hosts, and Clients

Devices of various users can act as host devices. Such host devices can bridge a connection between client devices that do not have WAN functionality and a gateway of a network (e.g., a cellular tower). In various embodiments, a host device can provide network access to various client devices, and a client device can obtain network access from various host devices.

FIG. 1 shows an example system 100 illustrating implementation of network bandwidth sharing (also called "data sharing") to provide network access to client devices without WAN functionality. FIG. 1 includes a primary data source 110, two host devices 120, and three client devices 130. Primary data source 110 may be any data source connected to a WAN, such as the Internet. Such primary data sources may include cell phone towers, satellites, high altitude balloons with network functionality, and other such network infrastructure. Primary data source 110 can communicate directly with each host device 120 via a WAN connection, such as wireless long-term evolution (LTE) cellular communications.

If a host device 120 is configured to share network resources with client devices 130, then the host device 120 and a client device 130 can communicate via a wireless LAN (WLAN) connection, such as WiFi or BT. The WLAN connection may be initiated by either the host device 120 or the client device 130. In certain embodiments, a client device 130 may connect to multiple hosts simultaneously. This may, for example, occur when the relative movement between a client device and the available host devices is large, and so any connection to one host device may be brief or uncertain. Similarly, a single host may share network bandwidth with multiple client devices at a time. In various embodiments, the number of client devices to share bandwidth may be managed by a host device user setting, may be selected as a fixed number, may be automatically calculated based on the available bandwidth of the host device, or may be determined based on any other device setting.

Although FIG. 1 shows the example of the connection between primary data source 110 and host device(s) 120 as being a cellular connection, other types of connections may be used. For example, the connection between primary data source 110 and host device(s) 120 may be a WiFi connection. Such a WiFi connection with primary data source 110 can be obtained by paying a service fee or having a particular password, which a client device 130 may not have. Thus, even if a client device 130 does have a capability to connect to primary data source 110, the client device 130 may not be able to connect directly with primary data source 110.

B. Proximity of Devices

Host devices and client devices can be scattered and be moving over time. This is particularly true when the users of the host devices and the client devices are different. The user of one host device could be the same as one client device, but be different than the user of other client devices.

Figure 2:
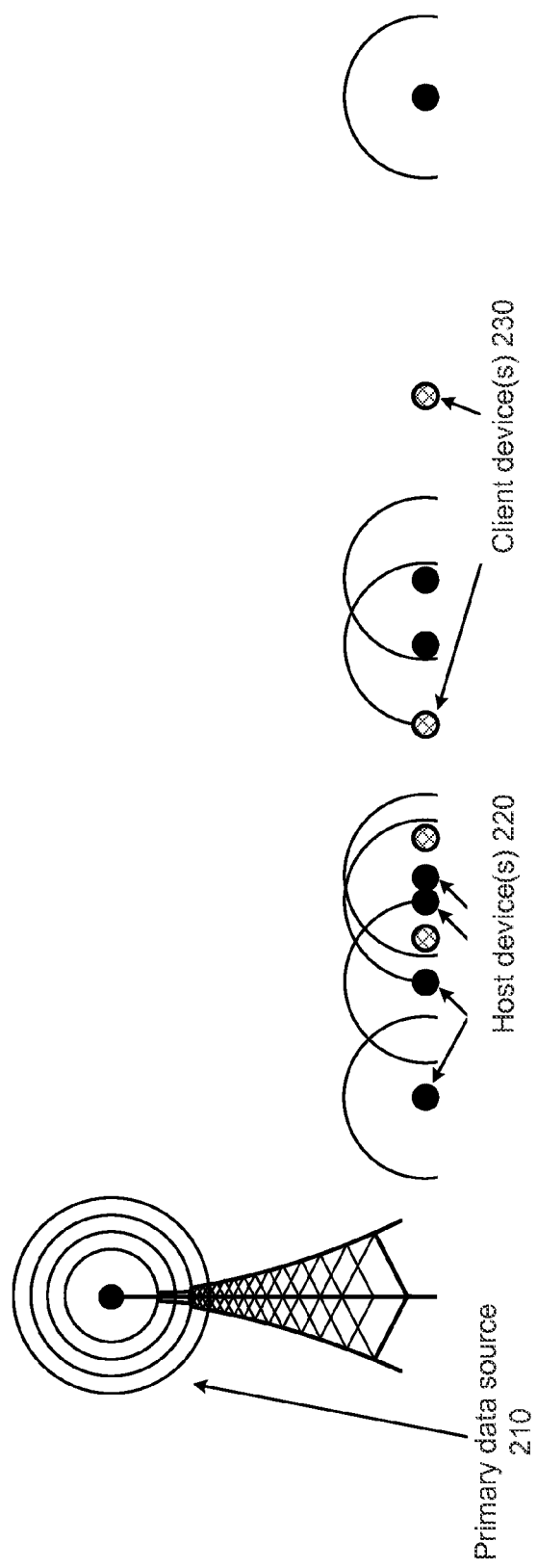
FIG. 2 is an example block diagram illustrating host devices and client devices at various locations.

FIG. 2 is an example block diagram illustrating host devices and client devices at various locations. FIG. 2 shows a primary data source 210, with a number of host devices 220 and client devices 230. Each host device is shown with service arcs indicating the effective communication distance for WLAN communications. The horizontal axis corresponds to a distance between the devices and a distance from primary data source 210.

In many environments, the devices will be on flat ground, so the service is essentially offered in a circle around the host device 220. But inside a building or in other environments, data may also be shared by a host device 220 to client devices 230 above or below a sharing host device 220. As illustrated by FIG. 2, with a sufficient number and density of sharing host devices 220, regular periodic service, near-continuous, or even continuous service may be offered to client devices 230. Sharing by multiple host devices 220 as a client device 230 moves may be managed by a centralized system.

C. User Interface for Specifying Restriction of Data Sharing

A host device can be configured by a first user to provide network access to a client device of a second user. The first user may provide such network access to the client device as long as the first user is not impacted. Accordingly, the first user may want to restrict network access (e.g., cut off, limit, or reduce) according to various criteria. A user interface can be provided for the first user to select various criteria for when and how to restrict network access.

In some embodiments, such a user interface may be provided by a touch screen input of a smart phone. In other embodiments, a networked computer or device may provide such a user interface separate from the host device, and allow sharing selections to be elected remotely. Other user interfaces, such as voice command, may also be used.

Figure 3:
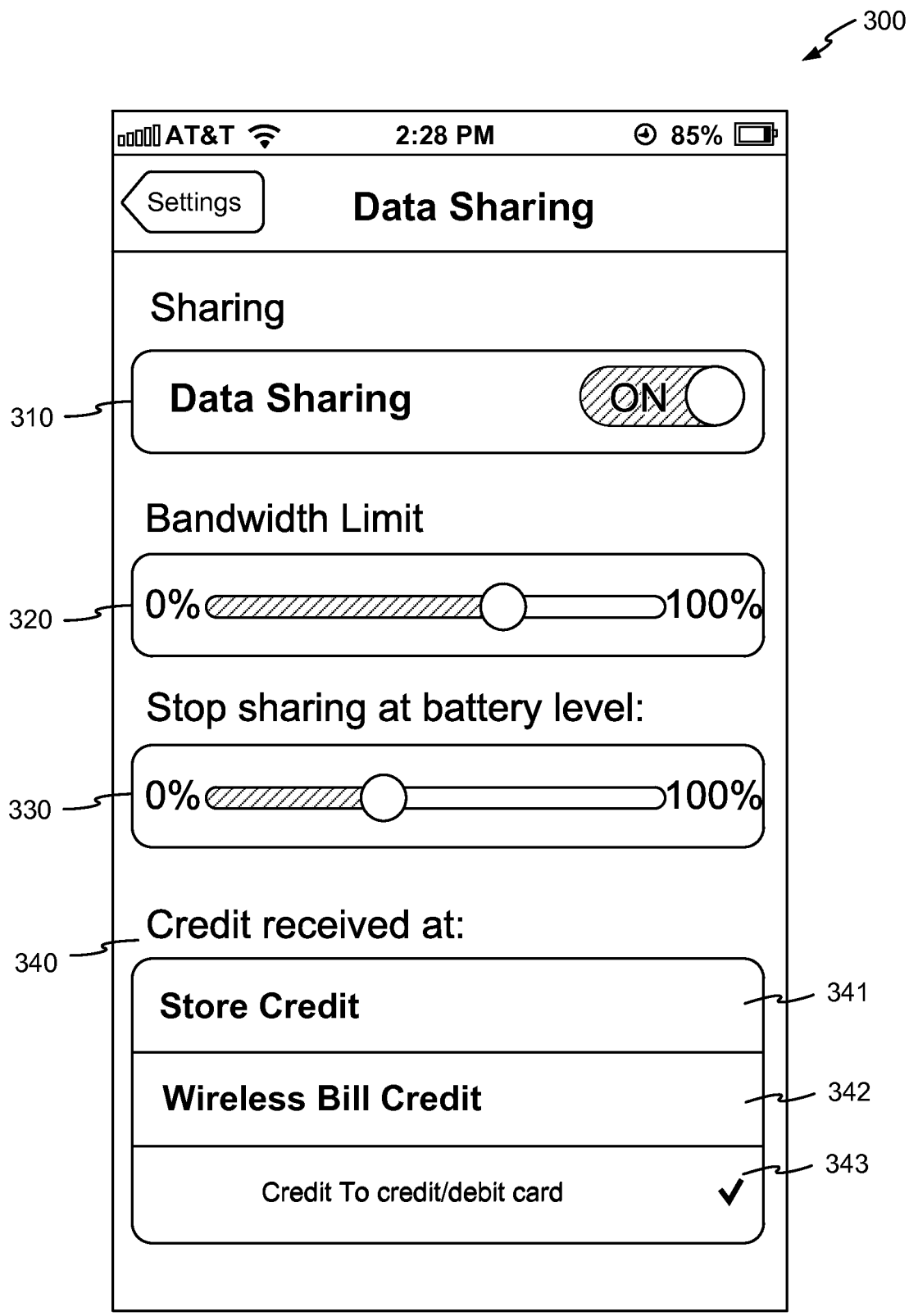
FIG. 3 illustrates an example user interface of a host device for providing network access to a client device.

FIG. 3 illustrates an example user interface 300 of a host device for providing network access to a client device. User interface 300 includes a number of user selections (sharing parameters), including a data sharing input (on/off) 310, a bandwidth limit 320, a battery level limit 330, and an incentive selection 340. Such inputs are examples of sharing parameters that a user may specify to restrict how and when network access is provided to client devices. Other examples of sharing parameters include a time of day and/or dates when sharing is allowed or not allowed.

Data sharing input 310 may comprise an on/off selection for a user to enable or disable sharing of network bandwidth. In various embodiments, such a data sharing input may have an off position, an on position, and a dynamic sharing position that automatically selects sharing options based on resources being used by the host device. Such resources can include the amount of network bandwidth being used by the host device and an amount of power used (e.g., battery level), as well as which applications are being used. For example, if critical applications are being used, the network access to a client device can be restricted. Such critical applications can be designated by the user. As examples, when such critical applications are used, the data sharing may be automatically turned off or an amount of bandwidth allocated for sharing can be reduced to a lower limit than would have otherwise been provided.

Bandwidth limit 320 may be used to specify a maximum percentage of the host device's available bandwidth that is usable for data sharing. For example, a host device can determine a maximum available bandwidth by downloading or uploading a file to test a maximum throughput achieved, or via a response from an Internet provider about the maximum bandwidth available. As shown, a bandwidth slider can choose a specific percentage. A specific percentage can be selected in various ways, e.g., by entering numbers. Besides a percentage, a slider could show 0 at a left end and the maximum available bandwidth at a right end. The selected bandwidth could be displayed numerically.

In other embodiments, a specific value for the maximum bandwidth could be entered. Such a specific value would be independent of the available bandwidth. For example, a user could specify 500 Kbps, 1 Mbps, 2 Mbps, or other values. Thus, in this example, the maximum bandwidth for sharing may not depend on the available bandwidth.

In some embodiments, a percentage and a specific value may be combined. For example, a user could specify that the shared bandwidth not be more than a percentage of available bandwidth and not more than a specific amount of bandwidth. Whichever value is lower would be used as the maximum bandwidth to share, given the available bandwidth at that time.

In various embodiments, a bandwidth limit can be applied to an instantaneous peak bandwidth usage, a sustained bandwidth usage, or both can be specified. The sustained bandwidth usage can be over a specified amount of time. Different limits can be provided for peak and sustained bandwidth usage.

Besides or in addition to a bandwidth limit, a total amount of shared data transmission can be specified. If a host device has an associated periodic maximum data allowance, such as a monthly data limit, an additional selection may enable an election of a maximum percentage or amount of this data cap that may be used for sharing. For example, the host device may have a monthly limit on the amount of data that can be communicated over the WAN. A user of the host device may want to limit an amount of data shared, and thus specify a limit for when data sharing is stopped. In some embodiments, a monthly limit (an example of a data capacity) may be increased for an account of the host device based on the amount of data shared (e.g., an increase to offset the amount shared), and thus a user of the host device may not be concerned with the amount of data shared.

Battery level limit 330 may be used to specify a battery level at which data sharing may stop, automatically be disabled, or be reduced. Multiple battery levels could be set for different levels of sharing that are provided. For instance, once the battery level goes below a specified battery level, the amount of bandwidth to be shared can be reduced. At each specified battery level, the amount of bandwidth to be shared can be reduced even further. An amount of bandwidth sharing (i.e., amount of reduction) can be specified for each of a plurality of threshold battery levels. For example, at a battery level of 50%, the sharing could be reduced from a first bandwidth limit (e.g., 80%) to a second bandwidth (e.g., 40% or 0% for stopping of sharing). Any number of levels can be provided. In some embodiments, a specific functional decline of the shared bandwidth can be specified as a function of battery level.

In an embodiment with a dynamic sharing setting, historical information about data sharing and/or network usage may be used to automatically select bandwidth limit 320, battery level limits 330, or other such limits based on various factors. For example, the host device can track the network usage by the host device and determine that at certain locations or times the host device uses a large amount of bandwidth, and thus data sharing can be turned off or limit can be reduced. The amount of data sharing can also be tracked for locations and times, and if high data sharing is found to recur at particular times and locations, limits may be decreased or data sharing turned off.

The historical information can be used to predict what network usage the host device might use, and thus how data sharing should be restricted. Current network usage can also be predicted based on current factors. For example, the user could be using a particular application that requires high performance for data transfer (e.g., in total size, number of packets, or latency). Such an application could be designated as a critical application. Example factors include sensor data (e.g., GPS, accelerometer, camera, etc.), user inputs, device location, or other such information that may be used to determine how and when to restrict data sharing by the host device.

In additional embodiments, a setting may enable a host device to determine what type of data will be shared. For example, a host device may elect to share small data packet pushes or alerts, but may decline to share multimedia files, photos, video or other such data intensive communications. Similarly, a selection may enable data pushes to client devices, but may refuse to relay data from a client device up the network to another device.

Additional examples of user interface selections for data sharing may include settings based on the type of network access the host device has. If a host device is connected to the Internet or a WAN via a wired connection, a first set of data sharing selections may be used, which would be generally higher than for a wireless connection. If the host device is connected via a non-cellular wireless connection (e.g., WiFi), a second set of data sharing selections may be used, which would generally be higher than for a cellular connection. If the host device is connected via a cellular data connection, a third set of data sharing selections may be used.

An incentive selection 340 may also be provided. Incentives can be earned by sharing network bandwidth with client devices or other users. The incentives can thus encourage the data sharing. The amount of data shared (bandwidth shared) can be monitored (e.g., by a server computer) and incentives can be determined. Different incentives can be provided based on options selected by the user of the host device.

User interface 300 illustrates three incentive selection options. Embodiments can include any one or more of these options, or other options. The first option is a store credit option 341, e.g., where media or software applications can be purchased. The second option is a bill credit option 342, e.g., for a bill associated with an account for the host device, such as a wireless bill for phone service. The third option is a credit to an account, e.g., a credit/debit card account. The account information can be stored on the host device.

The credits can be in various forms. Cash credits or other currency credits, such as those in the three options above, are one type of credit that may be provided. The credits can be for certain merchandise. For example, the credit can be for a specified number of songs or movies, or a certain value of such content. In one implementation, such content can be available to only users who have shared sufficient data. Credits can take the form of discounts or upgrades, both of which may be implemented automatically when a sufficient amount of data is shared. The amount of data shared can be tested periodically monthly) against a threshold to qualify for specified incentives during that time period (e.g., for a discount or upgrade for that month).

In other embodiments, data sharing by a host device may provide a related amount of credit for other devices of the user of the host device. For example, the user may also have another device that can act as a client device. This client device may need network access sometimes, and the user may not be carrying his/her host device. By sharing data with other client devices, the user may gain credits that allow the user to obtain network access for his/her client device from host device of other users. In this manner, a user can obtained network access to a degree that he/she has shared network access. Additional embodiments may provide a social network data sharing incentive, with user titles or social network reward tiers provided based on data sharing by a host device.

In addition to direct incentives, support for data sharing may be enabled by a network provider. This may be done, for example, by not counting data sharing against data limits associated with a host device, by providing more lenient rollover options for unused data, by increasing a data limit (which may be increased proportionally to the amount of bandwidth shared), by providing greater bandwidth to users that share a sufficient amount of data, by providing more frequent device upgrades for users that share data, or other such incentives.

In other embodiments, a credit can be social credit. For example, a social network could indicate an amount of sharing provided by the user. The amount could be signified on a profile page by any suitable indictor, e.g., a star or other symbol, a number, partial filling of an object, etc. The credit could cause rankings of posts by the user to increase, e.g., reviews could be given higher ranking (priority).

A client device may have a user interface similar to user interface 300. Such a client user interface may determine how frequently a client device will attempt to access shared data, what types of data will be accessed using shared data, power levels associated with such settings, and any other such settings for a client device.

Client devices and host devices may both have either user-selected or automatic criteria (e.g., priorities) for determining how and when the device communicates with another device. For example, if the two devices are moving in opposite directions, it may not be worthwhile to attempt a connection. Further, a metric can be used to determine which host device would provide a best connection, or conversely which client device can the host device most reliably provide network access. Such criteria may be based on proximity, signal strength, host battery levels, relative movement among the devices, or any other such device information. Aspects of provisioning of devices for data sharing may be performed by a server computer, e.g., one that stored data to be retrieved by a client device and/or that is to receive data from a client device.

II. Infrastructure for Data Sharing

In some embodiments, the data sharing can be done without having to explicitly set up another device on the sharing device. Normally, one would need to allow tethering explicitly on a user interface and specify a particular device to gain network access. In the examples above, the user can specify only some general parameters, and not have to allow access on a device-by-device basis. This section describes an example infrastructure that may be used to facilitate and track data sharing by host devices. In some implementations, the infrastructure can provide authentication of client devices and/or host devices such that network access is not provided to or obtained from non-authenticated devices.

A. System with Centralized Server Control and Security

Figure 4:
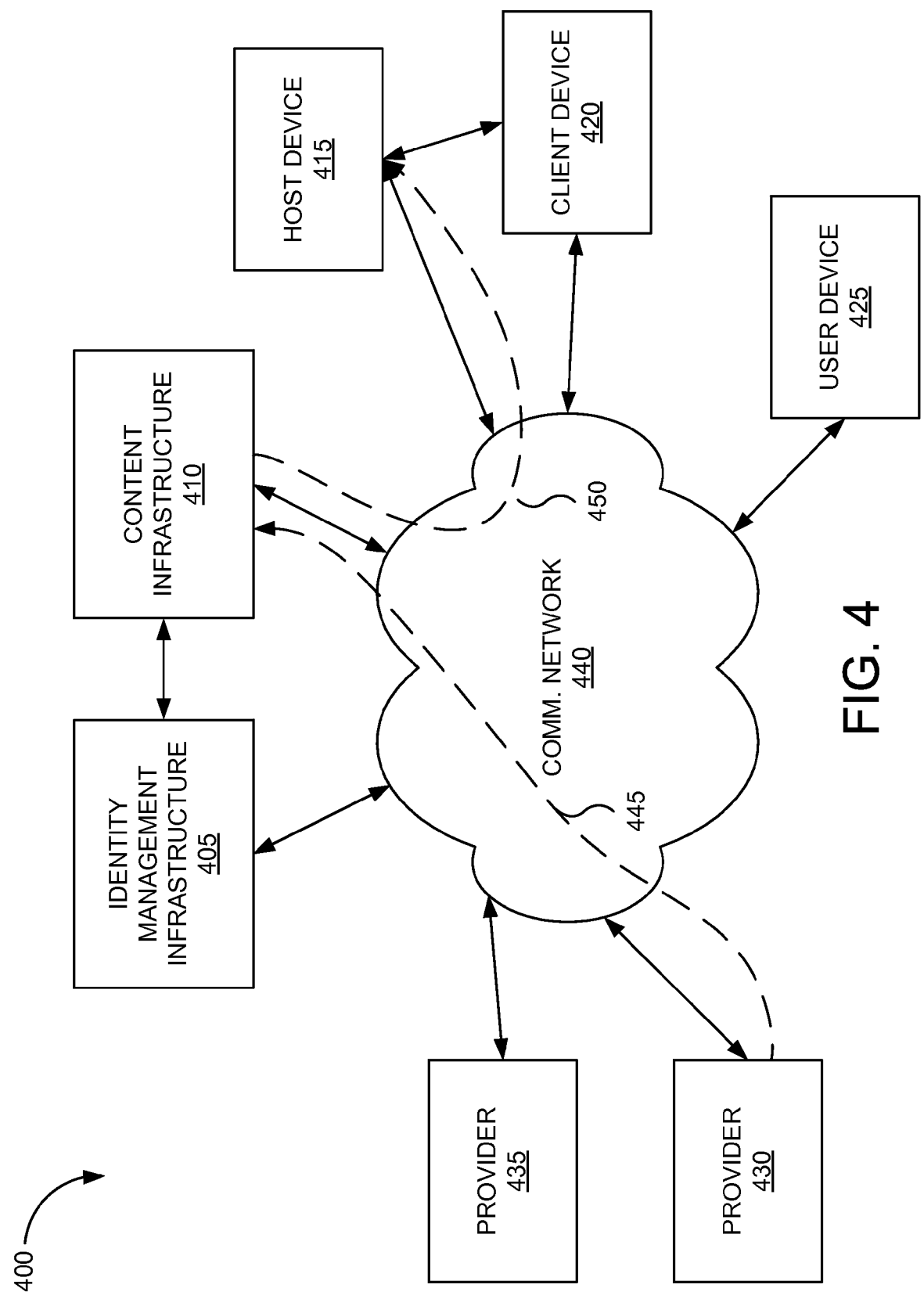
FIG. 4 is a block diagram of an example system including infrastructure that can facilitate network bandwidth sharing by host devices to client devices.

FIG. 4 is a block diagram of an example system 400 including infrastructure that can facilitate network bandwidth sharing by host devices to client devices. As shown, system 400 includes an identity management infrastructure 405 (e.g., one or more servers that implement an identity management service, authorization service, and/or authentication service), content infrastructure 410 (i.e., one or more servers that implement a voice/video call service, a messaging service, and/or a push notification service), host device 415, client device 420, user device 425, provider 430, provider 435, and communications network 440. As illustrated, identity management infrastructure 405, content infrastructure 410, host device 415, client device 420, user device 425, provider 430, and provider 435 are each capable of communicating with and through communications network 440 (representing the Internet, wide area networks, metropolitan area networks (MANs), local area networks (LANs), wireless area networks (WiLANs), radio access network (RANs), public switched telephone network (PTSN), etc., and/or combinations of the same). As illustrated, host device 415 can communicate directly with client device 420 without utilizing communications network 440, e.g., as part of a data sharing connection. The particular connections made by a host device 415 or client device 420 can change over time based on the location of particular devices and user selections.

1. Identity Management Infrastructure

Identity management infrastructure 405 can provide management of individual entities, their authentication, authorization, and privileges within or across systems, such as content infrastructure 410. Identity management infrastructure 405 may be implemented in various embodiments using a single server computer system or may include multiple server computer systems, web servers, application servers, networks, interconnects, and the like. Identity management services provided by identity management infrastructure 405 can include technologies and services, such as Active Directory, identity providers, password managers, access control providers, single sign-on (SSO) services, OAuth, security token services, or the like. Such aspects may provide security to enable host and client devices to provide identity information and authentication, such that the host and client devices may trust that the devices are able to safely and securely operate as part of a data sharing system.

Identity management infrastructure 405 can maintain information that authenticates the identity of a managed entity (such as a user, organization, and any associated devices, resources, services, applications, or the like). The authentication of an entity may be for a particular device or may be operable to authenticate for various devices that the entity may use. When the authentication is for a particular device, the information maintained by identity management infrastructure 405 can include a device identifier (e.g. a client identifier that identifies a client device). Examples of a device identifier include any unique value (e.g., a token, key, certificate, or unique user name assigned by identity management infrastructure 405, a media access control address (MAC address), serial number of a client device, and the like, and combinations thereof.

Identity management infrastructure 405 can verify that an entity is who/what it claims to be using a password, biometrics such as a fingerprint, a distinctive behavior such as a gesture pattern on a touchscreen, challenge-response protocols, one-time passwords (OTPs), 5-way authentications, and/or other techniques. Identity management infrastructure 405 further can manage authorization information that defines what operations an entity can perform in the context of a specific application, service, or resource. Some authorizations may be based on a role, device type, application, application type, or the like associated with a managed entity. Users are granted roles often related to a particular job or job function. Identity management infrastructure 405 can also manage descriptive information about managed entities and how and by whom that information can be accessed and modified.

As part of identity management, one or more host devices may be identified and associated with one or more client devices, such that data sharing or incentive information may be shared by the devices. Similarly host devices with a particular identity and client devices with a different identity may be provisioned for certain functionality within a data sharing system, such that a client device may have an identity that is allowed to request data from a host device, and a host devices has an identity that is allowed to share data. In certain embodiments, a single device may be authorized to both share and receive shared data. This may, for example, occur when a host device has completely used a periodic data allocation, so the host device may not share more data for the duration of the period, but may request data sharing from another host device.

Identity management infrastructure 405 can create one or more digital identities for managed entities. A digital identity can include entity identifying information (personally identifiable information or PII) and ancillary information. A managed entity can have multiple digital identities and each digital identity can encompass multiple attributes. A user can have a user identifier (e.g., a phone number, e-mail, etc.) that is linked to multiple devices. In addition to creation, deletion, modification of digital identities, identity management infrastructure 405 can manage ancillary entity data for use by services, such content infrastructure service 410.

Identity management infrastructure 405 can store capabilities of each device associated with a user identifier. Examples of device capabilities are whether a device includes a specific type or version of hardware; whether a device includes a specific type or version of software (e.g., operating systems or applications); whether a device is capable of performing a specific function, such as placing and receiving phone calls or sending and receiving short message service (SMS)/multimedia message service (MMS) messages; whether a device is capable of maintaining connections with other devices; or the like. The list of devices associated with a user can be sent to and stored at any other device of that user, such as host device 415 and client device 420 when associated with the same user identifier. Identity management infrastructure 405 can determine and collect capabilities of a device when it is registered and associated with the user identifier. Identity management infrastructure 405 can update the capabilities of a device periodically, for example, when the device re-registers or communicates with one or more services managed by identity management infrastructure 405. As part of such identity functionality, an identity may provide sharing incentives based on data shared or shared data consumed for multiple devices that share an identity.

Identity management infrastructure 405 can receive a single user identifier that is used to determine device identifiers for devices associated with the user identifier. During entity registration, in order to access services or resources managed by identity management infrastructure 405, one or more user or other identifiers and a unique entity or device identifier (UID) may be combined to generate an entity or device token. In various embodiments, the token is encrypted by applying a hashing algorithm (e.g., SHA-0, SHA-1, SHA-2, MD5, Whirlpool, or other hashing algorithms). The token generated and encrypted for an entity can remain constant in various embodiments. Once a token has been generated and encrypted by identity management infrastructure 405, the token can be sent back to the entity. The entity in some aspects can then distribute the token to services or resources managed by identity management infrastructure 405 or other third party services for a variety of purposes relating to authentication, authorization, accounting, or the like of the entity at those managed services or resources or the trusted delivery of content to the entity by the thud parties. This information may then be used by host devices and client devices as part of an initial handshake when the devices connect for data sharing. Such information may thus enable seamless data sharing without the need for user inputs at a user interface each time a connection between a host device and a client device occurs for data sharing. This may be implemented in a number of different ways, but such seamless connectivity may be particularly secure when the hardware and software of both the client and host devices are known and synchronized as part of a data sharing system to provide security when sharing data with a new and unrelated device.

2. Content Infrastructure

Content infrastructure 410 may be protected by and/or accessible to entities managed by identity management infrastructure 405. Content infrastructure 410 may be implemented in various embodiments using a single server computer system or may include multiple server computer systems, web servers, application servers, networks, interconnects, and the like.

Content infrastructure 410 can provide content to host device 415, client device 420, and user device 425 as well as to other devices and entities. Examples of content include a text message, a multimedia message, an impending calendar event, an audio/video call (e.g., using VOIP), or a notification of new data on a remote server. In some embodiments, the content can originate from one or more sources managed by identity management infrastructure 405 or provided directly by content infrastructure 410. In other embodiments, the content can originate from other sources. For example, content may originate from any one of host device 415, client device 420, user device 425, and providers 430 and 435. In various embodiments, any or all of these types of content may be shared by a host device 415 with a client device 420 as part of a data sharing system. User selections at a particular device may limit sharing to certain types of such content based on the user selections.

In another example, content may be received from other sources such as the Internet, cellular networks, public switched telephone networks, and the like. Content infrastructure 410 can then route the content to host device 415, client device 420, user device 425, and providers 430 and 435. In some embodiments, content infrastructure 410 may route through the infrastructure an SMS message received from or destined to a cellular network. In other embodiments, content infrastructure 410 may route through the infrastructure a voice call received from or destined to a public switched telephone network.

In some embodiments, content infrastructure 410 can send content to more than one device, when appropriate. A user may be associated with both user device 425 and client device 420. Content infrastructure 410 may route the content to both user device 425 and client device 420. A user device 425 may receive the communication directly, and the client device 420 may receive the communication via host device 415 as part of a data sharing link. Thus, a device such as a smart watch may receive an incoming phone call notification even if the smart watch is not connected to a WAN and is remote from the phone that is receiving the call, as long as the smart watch is able to receive shared data. In other embodiments, content is sent to only one device, e.g., to user device 425, which may forward a communication to client device 420. The client device 420 which may share an identity with user device 425 may then receive the forwarded communication via data sharing with unrelated host device 415.

In one aspect, content can include of one or more pieces of data, such as a device identifier (or token) as discussed above and a payload. A device token can be provided in content originating from a provider (e.g., provider 430 and/or 435), a device of a same user (e.g., from either host device 415 or client device 420), or a device of another user (e.g., user device 425), together with any payload the provider seeks to have delivered using content infrastructure 410. The device token can contain information that enables content infrastructure 410 to locate a device on which a particular service or client application is installed and that is registered to receive the content. The payload may include new information received at a server application or a reference to where the information is to be found. The payload may further include a property list that specifies how the user is to be alerted about this new information by the particular service or client application.

In certain embodiments, content infrastructure 410 may use a device token to manage one or more communications that use data sharing with multiple hosts to provide the communications to a single client device. This may occur when the only host devices available for sharing are moving relative to the client device, such that a host device is only able to share for a small period of time. For example, this may be three or four seconds, or may be less than one second. In such embodiments, content infrastructure 410 may send data to multiple devices, which may or may not be within range of the client device, based on a prediction that one of the host devices will be within range of the client device and be able to send the data to the client device via data sharing after the data is communicated to the host.

In some embodiments, content infrastructure 410 may use global positioning system data or other location data to predict when a host and client will be within range for data sharing, and will communicate data to the host device for sharing with the client device based on this prediction. Thus, for two way communications, a first part of a communication with a client device may occur with a host device sharing data, and as the host device moves out of range for data sharing with the client device, content infrastructure 410 may manage a second part of the communication of the data to occur using a different host device (which can share data with the client device) to complete the communication in two or more parts. This may occur with two, three, four, or any number of host devices being managed by content infrastructure 410 to complete a communication with a single client device.

In certain embodiments, data sharing from a host device to a client device may be focused on low bandwidth alert communications that may be completed in a small amount of time (e.g., on the order of a few milliseconds, tens of milliseconds, or hundreds of milliseconds). An alert can come in a variety of forms. In one example, content can be displayed to a user of a client device as an alert message or other visual representation, such as a badge associated with an application icon. Availability of the content can be further announced by playing a sound when an alert or badge is shown. When a user is notified that an application has a message, event, or other content data, the user can launch the application and see the details by either viewing the content, viewing information contained in a push notification, having the client application retrieve the referenced information, or the like. The user can also choose to ignore the notification, in which case the application is not activated. Thus, data sharing may, in certain embodiments, involve a small amount of data sent as an alert to a client device via a sharing host device, with the shared data activating an alert on the client device. A user interface of the client device may then be presented to activate an application, or to initiate a response communication via data sharing. If the data sharing connection that was used to communicate the alert to the client device is still available, the same connection may be used to communicate a response. If the connection is not available, a new data sharing connection may be established with the same host or with a new host. If a data sharing host device is not available, the response may be queued at the client device until a new data sharing connection is available.

Content infrastructure 410 can include push notification services that implement mechanisms to give client applications the ability to let users know that new content is available at one or more server applications, is on the device, or is incoming. A push provider (or simply provider) as used herein can refer to an entity having information to be forward and/or delivered using a push notification infrastructure. Generally, software developers (acting as providers) originate notifications in their server software when new data is available for users. A provider connects its server software with content infrastructure 410 through a persistent and secure channel. Identity management infrastructure 405 can ensure that the provider is authenticated (e.g., that the provider is who the provider alleges to be) and authorized to connect and utilize content infrastructure 410 in a trusted manner.

While monitoring for incoming data intended for its client applications, when new data for an application arrives, the provider can prepare and send a notification through its channel connection to content infrastructure 410, which pushes the notification to a push consumer or destination target device. Identity management infrastructure 405 can also ensure that the consumer or destination target device is authenticated and authorized to connect to and utilizes services of content infrastructure 410 in a trusted manner. A push consumer (or simply consumer or destination) can refer to an entity designated to receive information forwarded and/or delivered using content infrastructure 410. Additionally, host device 415 may be a provider of content to client device 420, and vice versa as well as provider 430 providing content to provider 435, and vice versa.

In one example of operation of content infrastructure 410, one or more server computers provide, provision, manage, and otherwise operate the push notification service for propagating information between provider 430, provider 435, host device 415, client device 420, and user device 425. Each may establish at least one persistent connection (e.g., an accredited and encrypted Internet protocol (IP) connection) with content infrastructure 410 to originate and/or receive content over this persistent connection. Connections can be authenticated and authorized by identity management infrastructure 405.

If a notification delivered by content infrastructure 410 for an application associated with a user's device arrives when the application is not running, the user's device may alert the user that the application has data waiting for it. Content infrastructure 410 may also provide a default quality-of-service component that provides store-and-forward capabilities. If content infrastructure 410 attempts to deliver a notification, but a target device is offline, the notification can be stored for a limited period of time, and delivered to the device when it becomes available. In some embodiments, all recent notifications for a particular application are stored. In other embodiments, only one recent notification for a particular application is stored. For example, if multiple notifications are sent while the device is offline, each new notification causes the prior notification to be discarded. This behavior of keeping only the newest notification is referred to as coalescing notifications. In other embodiments, if the device remains offline for a long time, any notifications that were being stored for a device may be discarded.

3. Incentives

In certain embodiments, incentives may be managed by content infrastructure 410, identity management infrastructure 405, or a separate incentive management computer. An amount of data shared by a host device may be identified by such a system, and an associated incentive may be communicated to the host device or another user device that shares an identity with the host device. In certain embodiments, an incentive may be provided for other aspects of data sharing, e.g., other than the actual amount of data shared. For example, an incentive may be provided for having data sharing turned on, even if sharing is not utilized by a client device. Database and incentive communication systems that receive information about a host device's data sharing and that communicate an associated incentive to a user may thus be integrated with various systems to provide a centrally managed system for data sharing. Such systems may additionally be integrated with the communication management systems, which may manage data sharing across multiple host devices or multiple client devices.

In still further embodiments, incentives may be sponsored by a particular client application to enable data sharing to a particular application of a client. For example, a client device may have a social network account that includes update alert settings to send update alerts to the client device. The provider of the social networking application may sponsor alerts for that particular application, such that a client device may use data sharing to receive communications associated with that particular application operating on the client device. The provider can fund or create the incentive for the host device, and the client device may be able to receive data sharing with no cost to the user of the client device. In other embodiments, advertisements, or user payments may be used in association with data sharing as a cost to a user of the client device. Communication of the particular data associated with the application may be selected by both the client device, with other types of data being blocked. Such a block may be created at content infrastructure 410, a host device 415, or a client device 420.

Alternatively, data sharing by a host device of the user may offset data sharing used by the user for a client device. In still further embodiments, a client device may have data sharing associated as part of a purchase of the client device. An up-front fee may be included as part of the sales price of the client device to provide a lifetime of data sharing as part of a network of host devices managed by content infrastructure 410.

4. Content Providers

Provider 430 and provider 435 may be implemented in various embodiments using a single server computer system or may include multiple server computer systems, web servers, application servers, networks, interconnects, and the like. In various aspects, provider 430 and provider 435 can provide client applications that run on host device 415, client device 420, and user device 425 and server applications that provide one or more services to which the client applications can connect. Provider 430 and provider 435 may seek to notify the client applications accessible to one or more of host device 415, client device 420, and user device 425 that information is available to their respective users.

In one aspect, a push provider is a software developer, company, or organization that maintains server software configured to interact with one or more client applications on one or more of host device 415, client device 420, and user device 425. Provider 430 and provider 435 can each connect with content infrastructure 410 through a persistent and secure channel while monitoring incoming data intended for their client applications. In some embodiments, provider 430 and provider 435 can connect over a binary interface that provides a high-speed, high-capacity interface, e.g., using a streaming TCP socket designed in conjunction with binary content. The binary interface may be synchronous or asynchronous. For each interface, TLS (or SSL) may be used to establish a secured communications channel.

5. Devices

Host device 415, client device 420, and user device 425 may each be embodied as a single device, a single computer system, multiple devices, or multiple computer systems. In various aspects, host device 415, client device 420, and user device 425 although labeled differently for convenience can each be embodied as a mobile device, a wearable device, or other mobile device (e.g., a laptop, palmtop, mobile phone, smart phone, multimedia phone, portable media player, GPS unit, mobile gaming systems, etc.). In addition to or in the alternative, host device 415 and user device 425 can be embodied as described above as well as being embodied as personal computer systems, mainframes, server computer systems, cloud services, or the like. Host device 415, client device 420, and user device 425 may include a variety of technologies that provide a communications connection. Some examples of connection technologies include wired connections (e.g., Ethernet, fiber, digital subscriber line (DSL), etc.) and wireless connections (e.g., WiFi, Bluetooth, WiMax, 6G, 4G, LTE, etc.).

Host device 415, client device 420, and user device 425 can run a variety of client applications that communicate with one or more server applications provided by one or more providers (e.g., providers 430 and 435). These client applications may include applications specific to the intended function of a device (such as telephony applications or GPS applications) as well as e-mail clients, update/upgrade clients, news clients, web/blog clients, podcast clients, social networking clients, or other types of client applications where notification messages may be sent. These client applications may represent to a user one or more notification messages received using content infrastructure 410. Notifications can be represented to users in one or more manners defined by an operating system of the device, a graphical user interface toolkit, and/or the applications themselves. Some examples of representations of notifications include a new e-mail indicator, a new news item indicator, a new podcast indicator, a change of on-line status of a social networking friend, and the like. In various embodiments, another service operating on a device can handle notifications for client applications.

Host device 415, client device 420, and user device 425 may receive an identifier (or device token) when a client application initially connects with content infrastructure 410 in order to receive push notifications. Providers 430 and 435 can use the token, or include the token, with any content or notification message so that it can be appropriately forwarded back to the device using content infrastructure 410. In various embodiments, to ensure trust, a provider communicates the token every time it connects with content infrastructure 410. Content infrastructure 410 can decrypt the device token and validate using identity management infrastructure 405 that the token was generated for the destination device. To validate, content infrastructure 410 can ensure that the device identifier contained in the token matches the device identifier in a device certificate used when the device registered with identity management infrastructure 405.

6. Communication of Data

A message (e.g., a notification) can be sent from provider 430 to client device 420 as illustrated by paths 445 and 450, with final transmission from host device 415 to client device 420. For example, provider 430 can send an authentication Secure Sockets Layer (SSL) certificate upon an initial connection with content infrastructure 410. Identity management infrastructure 405 can authenticate and authorize provider 430 as a registered and authorized sender of push notifications. This SSL certificate can also be configured with additional user-defined data. Identity management infrastructure 405 can utilizes the additional user-defined data to identify provider 430 in a trusted fashion. This information may be used to seamlessly verify that client device 420 is authorized by identity management infrastructure 405 to create a data sharing connection with host device 415. Other secure communications protocols (e.g., cryptographic protocols such as Transport Layer Security (TLS), etc.) can be used in other embodiments.

Communication of data may be initiated by a beacon communication from client device 420 to host device 415. This low power beacon communication may be received by host device 415, and used to verify that client device 420 is authorized to create a data sharing connection, e.g., when the communication includes a client identifier. Any associated communication to client device 420 may then occur. Such a system may conserve power at the client device 420 by preventing client device 420 from constantly using power on an antenna to listen for potential data sharing connections to host devices. In other embodiments, communication of data may be initiated by a beacon communication from host device 415 to client device 420. Host device 415 may periodically communicate a beacon communication, indicating that the host device is available for network bandwidth sharing. Accordingly, communications may be initiated by either a client device 420 or a host device 415 depending on user settings, density of available host devices, or other such system parameters.

In some embodiments, where provider 430 is associated with a particular application (e.g., Email, Facebook, or Twitter) and includes additional identifying (e.g., user-defined) data within the SSL certificate, identity management infrastructure 405 can not only authenticate provider 430, but also automatically provision push service for provider 430 and the application utilizing content infrastructure 410. For example, identity management infrastructure 405 can automatically extract any additional identifying data from the authentication certificate and have content infrastructure 410 attach the additional identifying data (or a portion of the data) to content (e.g., push-notification messages). In some embodiments, the additional identifying data may identify a topic or feed associated with provider 430 (or an application of provider 430) to which a user might subscribe via content infrastructure 410. Thus, the additional information in the authentication certificate can be leveraged to direct content to devices that have subscribed to the topic/feed or requested information regarding the topic/feed. In this way, a push service can be automatically provisioned for provider 430. This automatic provisioning may also include automatic creation of incentives for the user of a host device that will provide data sharing for the communication.

In certain embodiments, once provider 430 is trusted, content infrastructure 410 can receive the message from provider 430. The message may include a device token. Having received the message from provider 430, content infrastructure 410 determines the destination for the message. In various embodiments, the destination can be determined based on the device token that is sent along with the message, which may include information about the data sharing connection provided by host device 415. In some embodiments, it is not necessary to send destination information as part of a token. By determining or extracting the destination from the device token or otherwise obtaining destination information for the content, content infrastructure 410 can then estimate whether the data sharing connection from host device 415 will be available for a sufficient amount of time to conclude a communication, or if other host devices should be used to complete or verify the communication. Content infrastructure 410 may then route the message to the destination client device 420 illustrated by path 450, for example, via a persistent connection maintained by client device 420 with content infrastructure 410. If the destination device is "offline" or otherwise inaccessible to content infrastructure 410, the content may be stored, and delivery may be retried at a later time. Content infrastructure 410 can route content to a single device, multiple devices at the same time, or to one device for delivery to another device.

B. Notification Services

Figure 5:
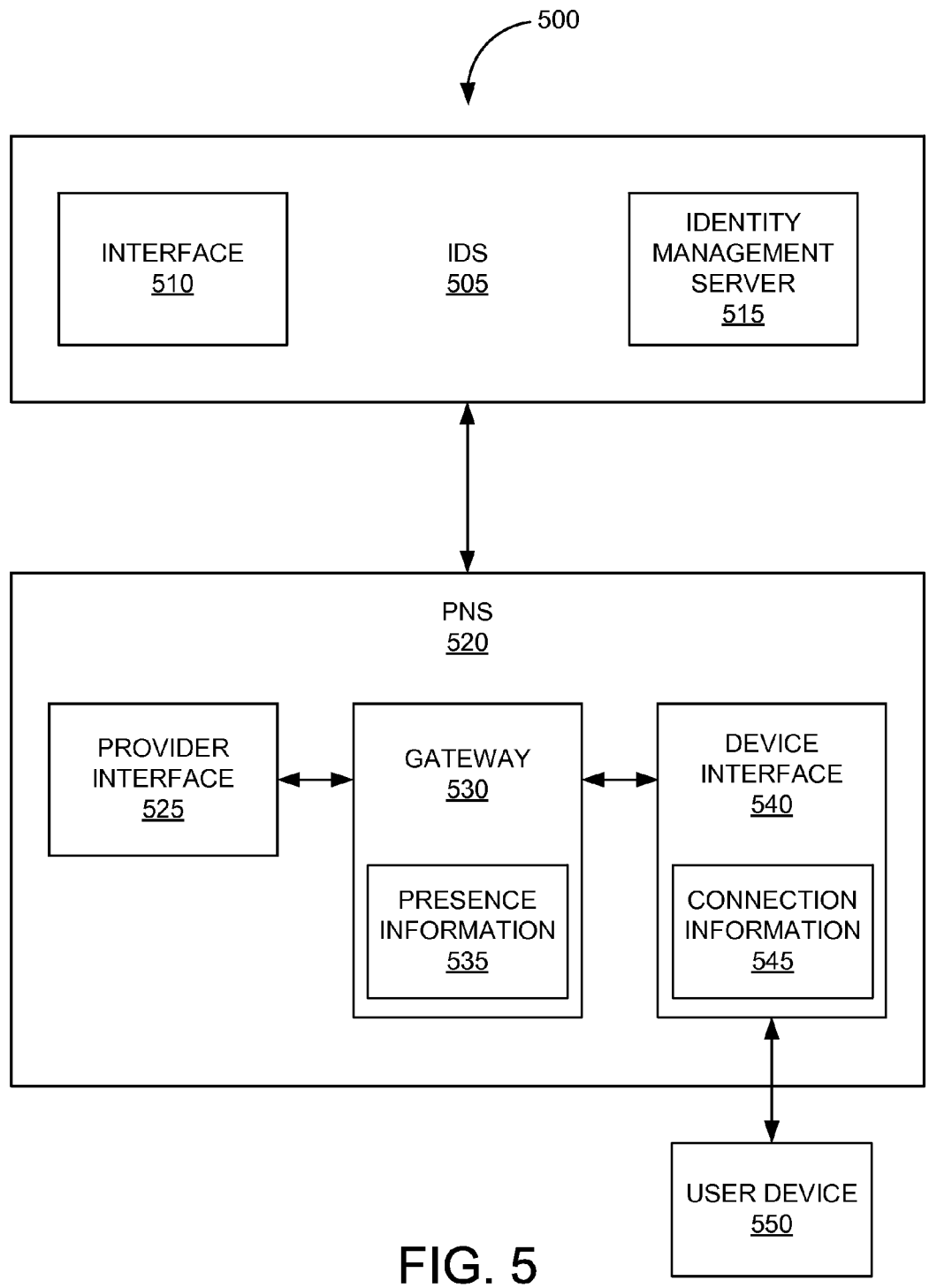
FIG. 5 is a block diagram of an example system that may be used to facilitate data sharing from a host device to a client device of another user.

FIG. 5 is a block diagram of an example system 500 that may be used to facilitate data sharing from a host device to a client device of another user. System 500 can implement identity management infrastructure 405 and content infrastructure 410 of FIG. 4, or parts thereof. System 500 includes identity services (IDS) 505, push notification services (PNS) 520, and user device 550. IDS 505 includes interface 510 and identity management server (IMS) 515. PNS 520 includes provider interface 525, gateway 530 (including presence information 535), and device interface 540 (including connection information 545). In various embodiments, user device 550 may be a host device that may provide a data sharing connection to a client device, or a client device that is communicating to PNS 520 via a host device. IDS services as described herein, including IDS 505, may be used to facilitate discovery between a host device used as a data sharing relay and a client device, which sends and receives information relayed via the host device.

Interface 510 can enable an entity (e.g., host device 415 or provider 430) to connect (e.g., via a network) in order to take advantage of service provided by IDS 505. As part of an authentication procedure (e.g., for a client device to be authenticated by a host device), an entity can send information (such as an authentication certificate) that is received via interface 510 upon an initial connection to IDS 505 or to a service, resource, or application managed by IDS 505 (e.g., PNS 520). Identity management server 515 can authenticate and authorize a device, user, or organization sending the information as a registered and authorized entity. One or more types of services can be authorized or provisioned for the device, user, or organization (e.g., call services, instant messaging services, chat services, notification services, etc.). To support a security model for PNS 520, entities and their devices may be required to possess certain certificates, certificate authority (CA) certificates, or tokens. Such authentication can be performed prior to establishing a data sharing connection between a host device and client device.

Identity management server 515 may also issue to a device a unique private key and certificate that the device uses to authenticate itself to identity management server 515 and establish a connection to PNS 520. Such a key and certificate (or other authentication data) can be provided by a client device to a host device for forwarding to PNS 520 or other server. The authentication data can be encrypted so that it is not usable by the host device. A device may obtain authentication data from identity management server 515 during device activation and store the data in a secure storage on the device or in a cloud server.

A client device can also receive a token (e.g., a push token) for communicating with a particular provider. This token can be provided to a host device and then forwarded such that the content for the client device can be sent through the host device. Each client application that utilizes PNS 520 can be responsible for delivering a particular token for a respective content provider.

Identity management server 515 may store any necessary certificates, CA certificates, and cryptographic keys (private and public) for validating connections and the identities of providers and devices. In this example, once the entity is trusted, system 500 can allow the entity to utilize push notification services provided by PNS 520. The entity may be a provider or other notification provider desiring to connect with PNS 520 (e.g., via a network). Although provider interface 525 is shown as being linked to gateway 530, provider interface 525 may be incorporated into gateway 530 or device interface 540. A user device can be a provider of content in various embodiments as well as be a destination of content routed using PNS 520.

Gateway 530 can determine the destination of content (e.g., push messages or call messages) via provider interface 525 or device interface 540. In various embodiments, gateway 530 can determine a destination based on presence information 535. In one aspect, presence information 535 is maintained using a device's push token. Accordingly, when a push notification is received at gateway 530 directed to a particular push token, gateway 530 can perform a lookup to determine whether there is a TCP socket descriptor associated with that push token. The socket descriptor can provide the TCP socket information and other networking information needed to transmit the push notification. In various aspects, presence information 535 includes mappings between authenticated entities and their connections to PNS 520. These connections can be utilized by PNS 520 for delivering content, notifications, and the like or otherwise communicating with an entity. Each mapping may be indicative of at least one entity and at least one connection mechanism to that entity, such as a network socket connection or other connection identifier. For example, a mapping may identify a destination device by its device token or a provider by its provider identifier. Additional information may be included in each mapping in order to facilitate communication with the entity's device.

Device interface 540 can allow presence information 535 to be generated when device interface 540 is connected to user device 550. User device 550 can assert its presence to PNS 520 upon establishing a connection. Device interface 540 can then generate a device/connection mapping in connection information 545. Device interface 540 can back-propagate connection information 545 to gateway 530 allowing gateway 530 to generate a device/connection mapping in presence information 535.

In various embodiments, a device wishing to receive content via PNS 520 can send authentication information either upon an initial connection with device interface 540 or directly to IDS 505. Identity management server 515 can receive the authentication information either directly or indirectly and then authenticate and authorize the device or its associated user or organization as a registered and authorized entity. Once the device is trusted, PNS 520 is informed and PNS 520 thereafter manages any connections made between the device and PNS 520 (such as with device interface 540 in connection information 545). Device information available at device interface 540 in connection information 545 can be periodically back-propagated to gateway 530 to generate or update presence information 535.

When the device initially connects with PNS 520, PNS 520 can provision the device. Devices may lose their connection with device interface 540 for various reasons. For example, a connection might be lost due to loss of cellular signal, or Wi-Fi signal, loss of power, or because a client device or host device has changed geographic locations such that a connection between the client device and the host device is lost.

When user device 550 attempts to reconnect to PNS 520 (e.g., a client device connecting via a host device), user device 550 can connect with device interface 540. According to one example, when gateway 530 receives content from provider interface 525, gateway 530 forwards the content received from provider interface 525 to device interface 540 based on its mappings in presence information 535. Device interface 540 can deliver the content received from gateway 530 to user device 550 for which information about a connection is maintained in connection information 545.

Upon receiving content from gateway 530, device interface 540 can perform a lookup or otherwise consult its device connections in connection information 545 and send the content received from gateway 530 to the appropriate device, for example, over the connection associated with user device 550. In one aspect, device interface 540 inspects the device token associated with the content to be delivered and determines whether a match is found between the device token and the connections that device interface 540 manages in connection information 545. Device interface 540 can deliver the content using the connection established by the device having the given device token.

III. Methods for Data Sharing

Various methods can be performed by a host device to provide data sharing. For example, a host device can perform an authentication of the client device with a server, prior to sharing network bandwidth. As another example, a host device can specify various restrictions for sharing network bandwidth, e.g., a maximum bandwidth to share, a battery level at which sharing is restricted, and other examples described in section I(C). Methods can also be performed by a client device to obtain data via a host device. For instance, a client device can perform an authentication of the host device with a server, e.g., via messages passed through the host device. Methods can also be performed by a server (e.g., an identity management server) to enable and monitor data sharing. For example, the server can determine an amount of sharing provided by the host device and provide an incentive to the user of the host device.

A. Host Device with Authentication

Figure 6:
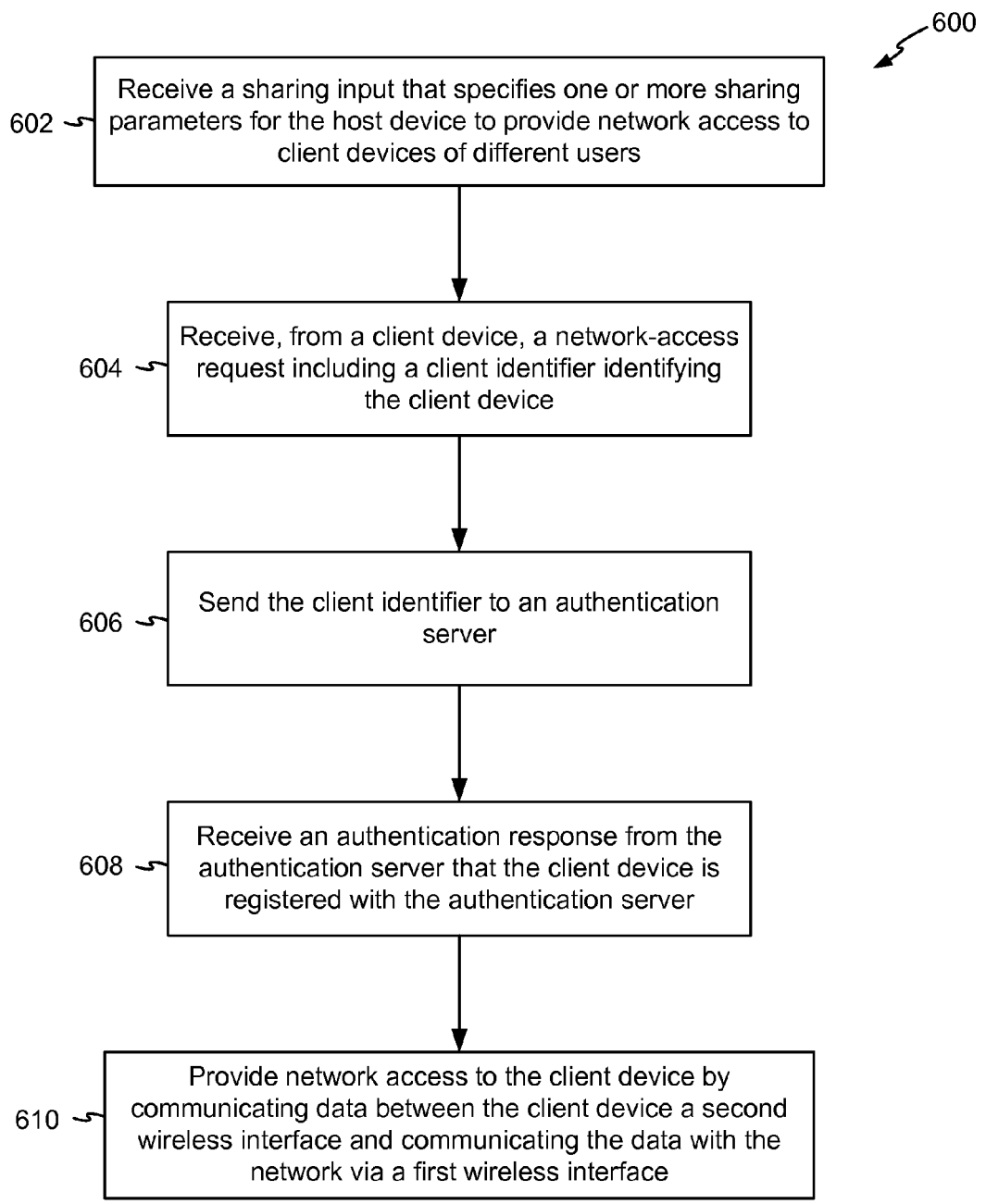
FIG. 6 is a flowchart illustrating an example method of a host device authenticating a client device before sharing network bandwidth with the client device.

FIG. 6 is a flowchart illustrating an example method 600 of a host device authenticating a client device before sharing network bandwidth with the client device. The host device may be associated with a first user and the client device may be associated with a second user different from the first user. Method 600 and other methods described herein may be performed at a host device that may comprise a first wireless interface for communicating to a network, a second wireless interface for communicating to the client device, a memory, an input module, an output display, and a processor coupled to the first and second wireless interfaces, to the memory, and to the input module.

At block 602, the host device receives, via the input module, a sharing input that specifies one or more sharing parameters for the host device to provide network access to client devices not associated with the first user. Such an input module may operate by displaying a user interface such as the user interface 300 of FIG. 3 and receiving a user input that enables network sharing. Various parameters may be provided, e.g., as described in section I(C). In some embodiments, the sharing input can simply specify that sharing is to be provided. Default parameters for other settings can be automatically used, if the user does not specify any other parameters.

At block 604, after receiving the sharing input, the host device receives a network-access request from the client device. The request can include a client identifier that identifies the client device. Examples of a client identifier include any unique value assigned by an authentication server, a media access control address (MAC address), one or more serial numbers, and the like.

In certain embodiments, the network-access request may be part of a more complex handshaking process to ensure security at both the client device and the host device. As part of such a process, each device may include embedded security as a first level of protection against unauthorized access. The client device can obtain the client identifier from an authentication server, e.g., IDS 505 and identity management infrastructure 405.

At block 606, the client identifier is sent to an authentication server. Such an authentication server may operate as part of an identity services system, e.g., as described for FIGS. 4 and 5. The authentication server can use the client identifier to access a database table that includes client devices that have been registered for data sharing. If a match to the client identifier is found, then the authentication server can indicate that the client device is registered for data sharing.

Accordingly, the host device may use the client identifier and the authentication server to ensure that network access is not provided to just any device. Further, authentication server can track which client devices have used which host devices in case it is necessary to investigate improper usage of the data sharing connection between the host device and the client device. Additionally, in certain embodiments, host identifiers may also be sent in order to verify that the host is secure and authorized to share data with the client device.

At block 608, the host device receives an authentication response from the authentication server. The authentication response can provide an indication that the client device is registered with the authentication server for obtaining network access. In certain embodiments, additional security communications between client and host devices may also occur to enable secure sharing. For example, a client device may need to provide an authentication credential (e.g., a token or a password), which may be encrypted. Such an authentication credential can be separate from any information that a user may use to access a website, and may be provided by the authentication server when the client device registers. The authentication credential can be updated periodically to ensure security.

Although a token or password may act as a client identifier in some embodiments, a token or password (or other authentication credential) can supplement the client identifier in other embodiments. In such other embodiments, the authentication server can store the client identifier in association with the authentication credential and check whether received values match both stored values before sending an affirmative response to the host device regarding whether the client device is registered with the authentication server. If the client identifier and/or any authentication credential (if provided) does not match, a negative response can be provided to the host device.

In some embodiments, the host device may receive other responses from the authentication server or an incentive server, which may be the same. For example, the authentication server can provide any measurements that may affect implementation of the one or more sharing parameters. For example, the authentication server can provide a current measure of data usage by the host device, which may trigger the host device to determine to restrict the providing of network access to client devices of other users. The host device can also measure such data usage.

As another example, the authentication server can provide any information about an incentive (e.g., a change in incentive), which may cause the host device to restrict network access based on a rule. In one implementation, a user can specify a rule (e.g., via one or more sharing parameters) that network access can be provided as along as the exchange rate for an amount of data shared corresponds to at least a specified amount of credit on an account. The rule could engage after a certain amount of data has been transferred, e.g., more network access can be provided, but only of the amount of credit is sufficiently high. In another implementation, the host device can provide network access to the client device only if the incentive increases (e.g., credit earned per data shared) when the battery level decreases below a certain amount. In some embodiments, a client device can agree to a certain price to be deducted from an account or amount of data to be deducted from an account and provided to the host device.

At block 610, the host device can provide network access to the client device, responsive to the authentication response. For example, once the authentication server authenticates the client device and sends the affirmative authentication response, the host device may begin to allow network access. The network access may be provided by communicating data between the client device via the second wireless interface and communicating the data with the network via the first wireless interface.

If multiple client devices are currently sharing bandwidth from a single host device, the host device may implement load balancing for the shared network resources available to each client device. Similarly, if a single client device has communicated with multiple hosts regarding possibly sharing bandwidth, additional communications may occur to let other hosts know that a sharing connection has been established. Further, as the sharing communication progresses, additional support communications may occur regarding possible hand-off of communications between host devices if the host device and client device are moving relative to each other. Similarly, if a host device's user adjusts sharing settings or sharing limits are reached at a host device, the host and client may communicate to terminate the sharing connection in an orderly fashion.

B. Host Device with Resource Threshold

Figure 7:
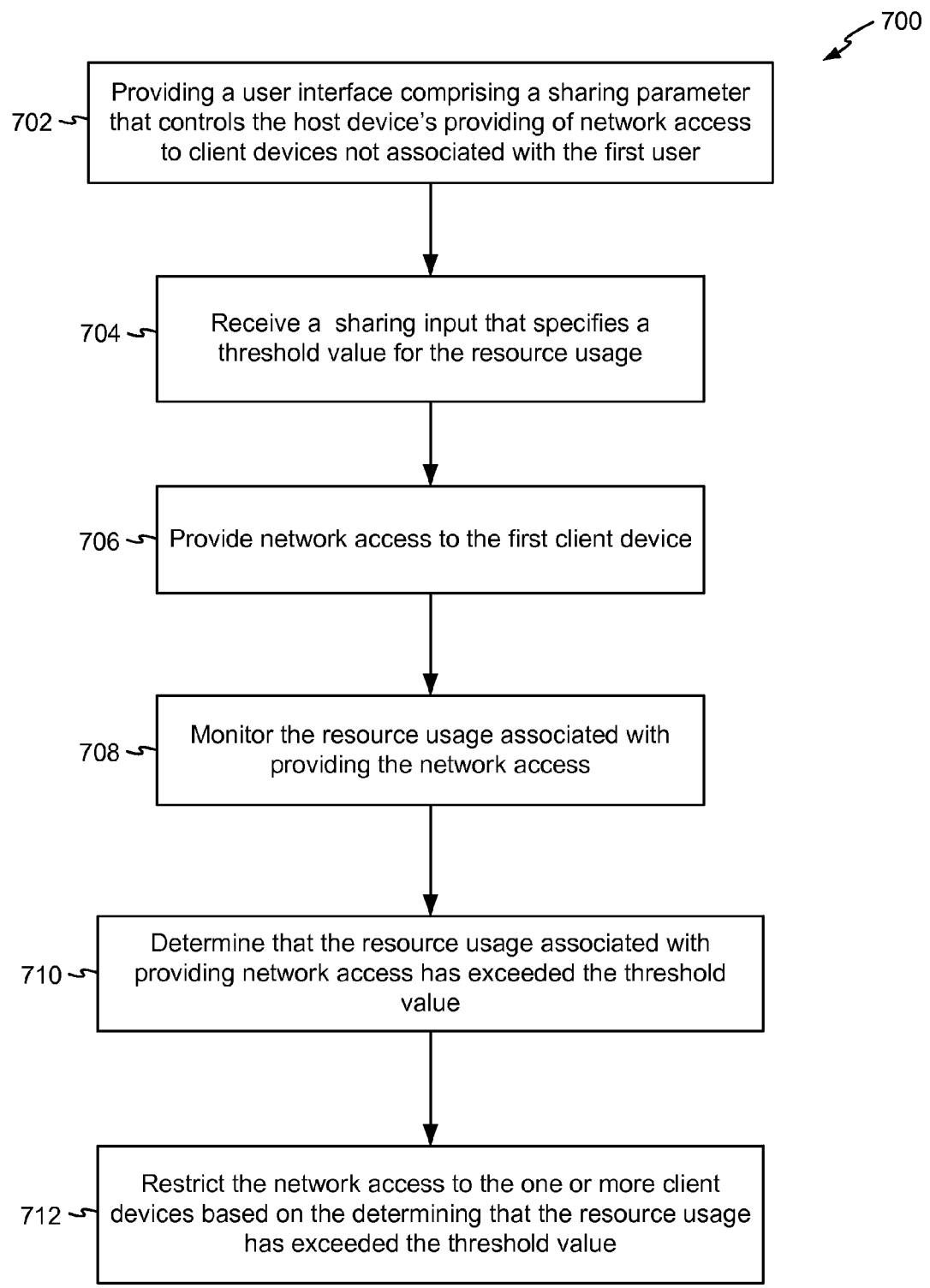
FIG. 7 is a flowchart illustrating an example method of specifying sharing parameters for a host device to provide network communications for a client device.

FIG. 7 is a flowchart illustrating an example method 700 of specifying sharing parameters for a host device to provide network communications for a client device. The host device may be associated with a first user and the client device may be associated with a second user different from the first user. In some embodiments, method 700 may be performed at the host device comprising a first wireless interface for communicating to a network and a second wireless interface for communicating to the client device.

At block 702, the host device displays provides a user interface comprising a sharing parameter that controls the host device's providing of network access to client devices not associated with the first user. The user interface may be provided in a variety of ways, e.g., on a display or via voice commands. The sharing parameter can correspond to a resource usage associated with providing the network access to the client device. The battery limit and bandwidth limit in FIG. 3 are examples of such sharing parameters that correspond to their respective resource usage (e.g., battery level and bandwidth usage).

At block 704, the user interface receives a sharing input that specifies a threshold value for the resource usage. The threshold value can control when the host device is to provide network access to client devices not associated with the first user, and/or when the host device is not to provide network access to client devices not associated with the first user. As examples, a user can specify a threshold bandwidth below which sharing is allowed and a threshold battery limit below which sharing is restricted (e.g., reduced or stopped).

At block 706, the host device can provide network access to the client device. The network access can be provided as in method 600, or in part as described in method 600. For example, the network sharing can proceed as in block 610. A determination to provide network access can depend on the threshold value and current resource usage of the host device. If the current resource usage does not violate the threshold value then network access can be provided.

At block 708, the resource usage associated with providing the network access to the client device may be monitored. The monitoring can be done at the host device or at a server. For example, the host device can determine a current battery level and/or bandwidth being used. As examples, the monitoring can be performed at periodic times or in response to a trigger. If the resource usage corresponds to an amount of data communicated with the network, a server may keep track of the amount of data. In other embodiments, the server can track other values that may be determined by the server.

At block 710, it is determined that the resource usage associated with providing network access to the client device has exceeded the threshold value. For example, the host device can periodically check the resource usage and compare the usage to the threshold value. As another example, a server can monitor periodically check the resource usage and compare the usage to the threshold value. The server can then send a message to the host device indicating that the threshold has been exceeded.

The resource usage can exceed the threshold value by being below or being above, which depends on the type of resource usage involved. For example, a bandwidth usage above the threshold would cause the sharing to be restricted, while a battery usage below a threshold level would cause the sharing to be restricted.

At block 712, the host device can restrict the network access to the client device based on the determining that the resource usage has exceeded the threshold value. The restriction can include a full stoppage or a partial reduction. The restriction can include other forms, such as the type of data (e.g., priority level of data or whether data is message vs. media). The amount of reduction can be specified by the user. The resource usage can exceed the threshold value by being greater than (e.g., bandwidth) or less than (e.g., battery) the threshold value.

In some embodiments, a subsequent threshold of the resource usage can be selected when a first threshold value is exceeded. For example, a certain reduction in sharing (e.g., reducing available bandwidth) can be made at the first threshold value (e.g., a first battery limit). The subsequent threshold can be used to implement a further reduction if the subsequent threshold is exceeded. When the thresholds related to a battery level, the available bandwidth can be decreased as the battery level decreases. Thus, the amount of battery used to provide network access can be decreased as the battery decreases.

C. Client Device

Figure 8:
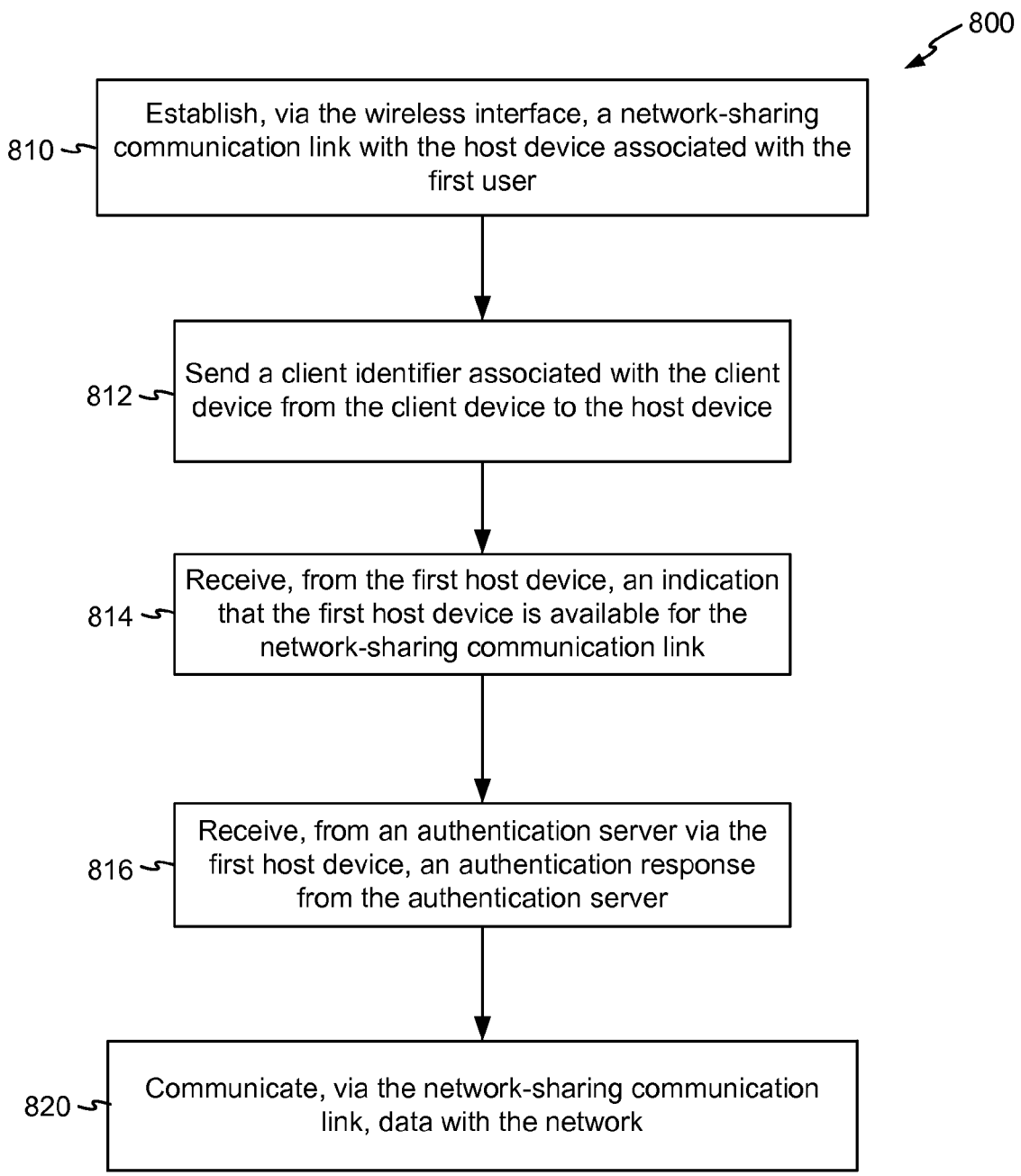
FIG. 8 is a flowchart illustrating an example method of using a client device associated with a second user to access a network via a host device associated with a first user that is different than the second user according to embodiments of the present invention.

FIG. 8 is a flowchart illustrating an example method 800 of using a client device associated with a second user to access a network via a host device associated with a first user that is different than the second user according to embodiments of the present invention. Method 800 may be performed at a client device that may comprise a processor, a memory, an input device, and a wireless interface.

At block 810, the client device establishes, via the wireless interface, a network-sharing communication link with the host device associated with the first user. The network-sharing communication link may allow the client device to communicate data with the network once the link is established with a host device that has access to the network. The link may use any suitable wireless protocol, such as Bluetooth or WiFi. The client device can send a beacon communication (e.g., a Bluetooth beacon) to the host device as a data sharing request to establish the network-sharing communication link. Establishing the network-sharing communication link according to such an embodiment may involve various steps, e.g., as described below.

At block 812, a client identifier associated with the client device can be sent from the client device to the host device. The client identifier can be as described herein. For example, the client identifier may have been received from an authentication server when the client device registered with the authentication server. The client identifier can be sent in a network-access request. In response to such a request, the host device can send the client identifier to an authentication server.

At block 814, the client device can receive, from the host device, an indication that the host device is available for the network-sharing communication link. The determination of whether the host device is available may be based on a variety of factors, such as whether the host device is connected to the network, resource usage of the host device (e.g., a battery level or a current bandwidth used by the host device), and velocity of the host device (e.g., if moving too fast or in opposite direction of client device for a network-sharing communication link to be made).

As part of determining whether the host device should share network access with the client device, the host device can send the client identifier to the authentication server and can receive a response about whether the client device is registered with the authentication server. The authentication server can search a database to find a matching client identifier. Accordingly, the client identifier is usable to determine that the client device is registered with the authentication server. The client identifier can be encrypted (as can other data communicated between the client and the host) so that the host device does not obtain the identifier or other data. The client device and the authentication server can have a shared secret (e.g., a key) that is used for encrypting and decrypting the client identifier and any other data. The shared secret may be obtained from the authentication server during device registration and store the shared secret in a secure storage on the client device.

In some embodiments, the client identifier can be a shared secret that is user for establishing the network-sharing communication link. Such a client identifier would generally not be useful in other situations, and thus reduce the likelihood of the shared secret being hacked and saved by the host device. Such a client identifier could be sent unencrypted, and the authentication server can compare to its known secret to know that the client is authenticated.

At block 816, the client device can receive, from an authentication server via the host device, an authentication response from the authentication server. The authentication response provides an indication that the host device is registered with the authentication server for obtaining network access. The authentication response sent from the server to the host device can include a communication identifier that specifies that the authentication response corresponds to a particular network-sharing communication link for a particular client device. In some embodiments, the communication identifier can be specified by the host device and sent to the authentication server in an authentication request. In this manner, the host device can determine which client device to send the authentication response. In other embodiments, the communication identifier can correspond to the client identifier.

In some embodiments, the authentication response can be encrypted so that the host device cannot alter or otherwise spoof the authentication response. Thus, the authentication response can be encrypted so that it is not usable by the host device. The authentication response can include an error correction code to verify that the authentication response has not been tampered with, e.g., a checksum. Any encryption data (e.g., key) for encrypting a message (e.g., a request) sent to the authentication server via the host device or decrypting the authentication response can be obtained by the client device at the time of registration. The authentication response can also include credential data that verifies the authentication server to the client device, e.g., a shared secret that is known to the client device and the authentication server. Once the authentication response is decrypted the client device can compare a shared secret in the response to verify the authenticity of the response.

At block 820, the client device communicates, via the network-sharing communication link, data with the network. The data can be sent over the wireless interface to the host device, which can forward the data to the network. Data can also be sent from the network to the host device and then sent to the client device over the wireless interface. Examples of the wireless interface can include any variety of Bluetooth or a peer-to-peer WiFi (e.g., ad hoc WiFi).

The network-sharing communication link can be established in response to various events at the client device. For example, the network-sharing communication link can be established in response to an update request from an application executed by a processor of the client device. In various embodiments, the application may create such an update request automatically (e.g., based on a setting of the user, a time of day, a time since last network connection, and the like) or directly in response to a user request to send data to or obtain data from the network. As another example, the network-sharing communication link can be established based on a periodically scheduled synchronization determined by system settings of the client device. For example, the user can wish to update messages every 30 minutes. In various embodiments, if no host device is available, the client device can continue attempting to establish a network-sharing communication link, postpone for a specified amount of time, or clear the attempt in favor of attempting at a next schedule synchronization.

D. Server

Figure 9:
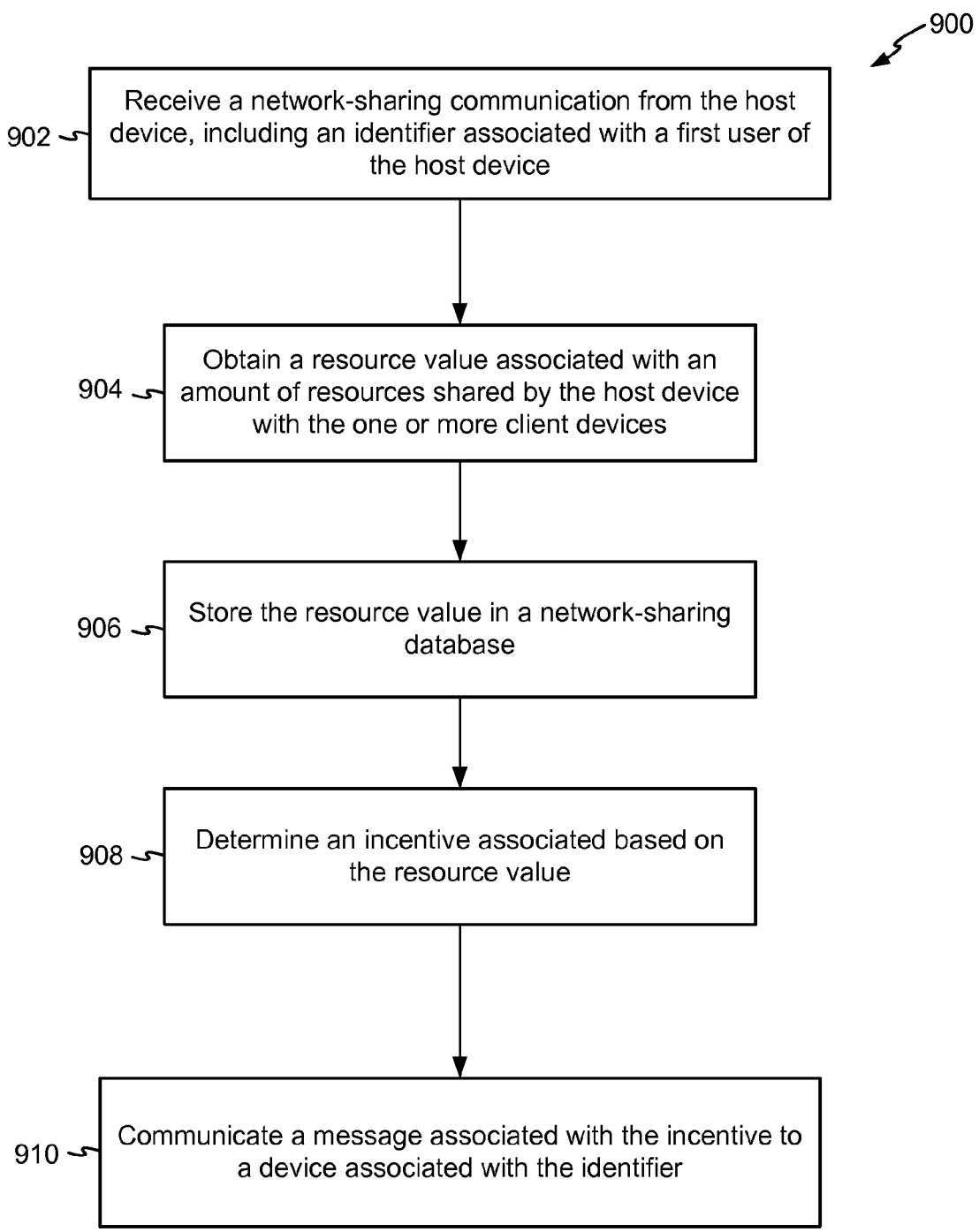
FIG. 9 is a flowchart illustrating an example method of using a server computer to facilitate bandwidth sharing by a host device to a client device.

FIG. 9 is a flowchart illustrating an example method 900 of using a server computer to facilitate bandwidth sharing by a host device to a client device. The host device may be associated with a first user and the client device may be associated with a second user different from the first user. Method 900 may be performed at a server computer that comprises a network interface, a memory, and a processor coupled to the network interface and the memory.

At block 902, the server computer receives, via the network interface, a network-sharing communication from the host device. The network-sharing communication comprises an identifier associated with the first user. The communication can indicate that the host device is in a data sharing mode. The communication can cause the server to monitor the data sharing. Such a communication can be sent from the host device in response to data sharing input (e.g., data sharing input 310) being turned on. As an example, the identifier can correspond to a data sharing account for the first user.

At block 904, the server obtains a resource value associated with an amount of network resources shared by the host device with the one or more client devices. As examples, the resource value can be an amount of data shared, an amount of bandwidth shared, or an amount of time over which data is shared, or a combination. In some embodiments, the server can obtain the resource value by monitoring the network usage by the host device. The resource value can be measured over a specific time period, e.g., on a monthly basis. The monitoring can be performed by requesting the resource value from the host device or another server than measures the resource value.

At block 906, the server stores the resource value in a network-sharing database. The resource value can be stored in association with the identifier, e.g., in a database record. The resource value can be updated when a new value or additional data sharing values are obtained. For example, the server may determine that 10 MB more (or other increment of MB or GB) of data has been shared and add that to the existing total for the resource value.

At block 908, the server can determine an incentive based on the resource value. The incentive can be any incentive, e.g., as described herein. For example, the server can determine to reduce a monthly limit for data usage on the network for the host device. The amount of reduction can correspond to the amount shared. The determination of the inventive can be executed on a periodic basis, e.g., monthly based on the resource value for that month. The type of incentive can depend on a selection made by the user of the host device. Such a selection can be stored by the server fir determining the type of incentive, and then the resource value can be used to determine the extent of the incentive.

At block 910, the server communicates a message associated with the incentive to a device associated with the identifier. The message can be sent to the host device, as well as other devices of the first user, e.g., a different computing device, such as a tablet or a notebook computer, if the host device was a phone. The message can indicate the type of incentive and/or a value of the incentive. The message can also include other information, e.g., how to earn other incentives.

IV. Host and Client Device

Figure 10:
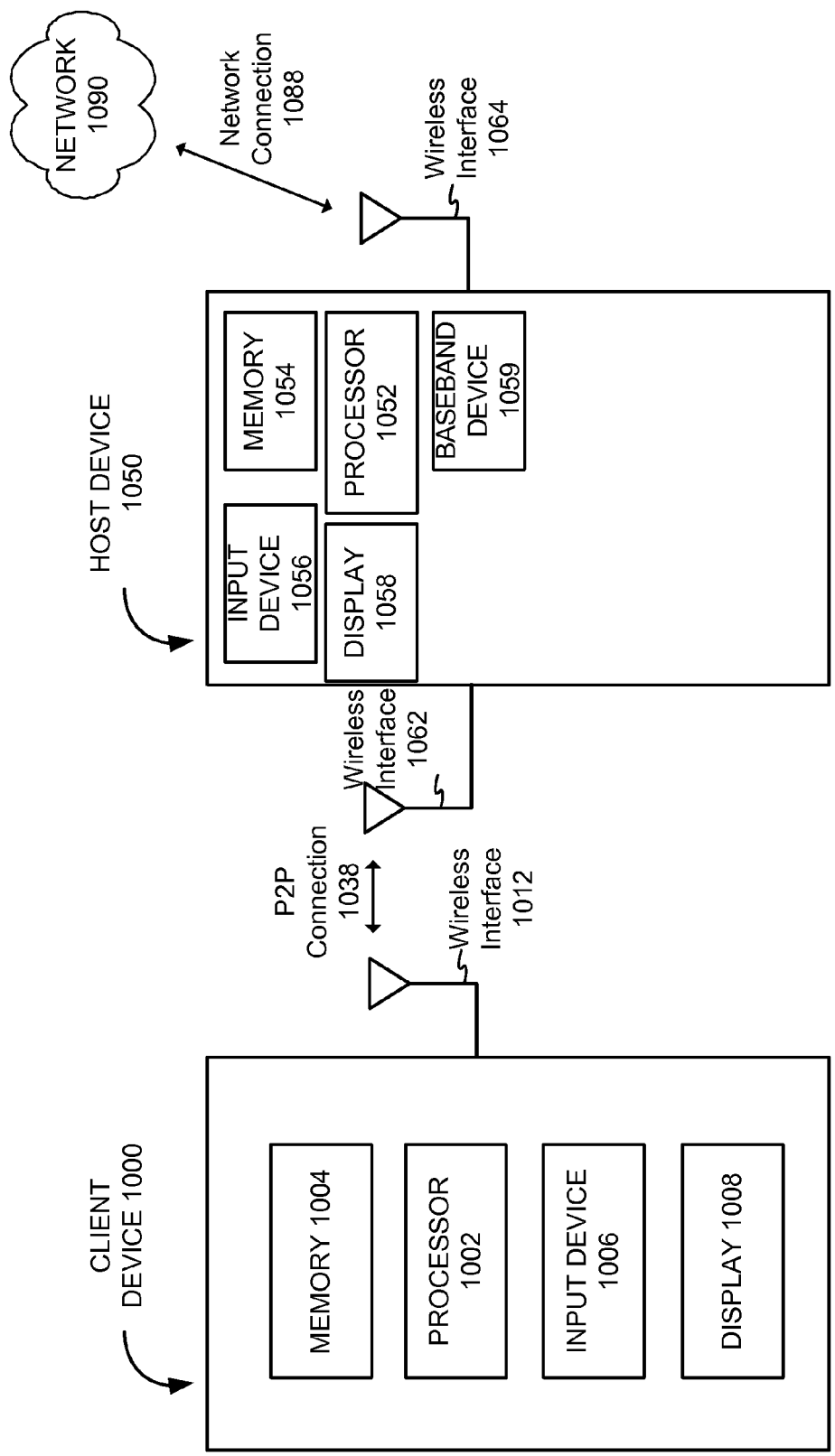
FIG. 10 is a diagram of an example client device and an example host device.

FIG. 10 illustrate additional examples of client devices and host devices that may be used in conjunction with, or as part of, systems 100 and 500 of FIGS. 4 and 5 to implement data sharing as described above. While two embodiments are illustrated by these figures, various implementations may include any number of client devices, host devices, and different networks, which may be supported by the devices in a particular setup. It should be apparent that the systems shown in FIG. 10 illustrate one embodiment, and that other similar embodiments can have more or fewer components than what is shown. Other embodiments may also include different configurations of the illustrated components, while remaining within the scope of the innovations herein.

FIG. 10 illustrates an embodiment with client device 1000, host device 1050, and network 1090. Client device 1000 may be any device accessible by a wireless interface, including a desktop computer, a laptop computer, a smartphone, a tablet computer, a wearable device (e.g. a watch, earpiece, or necklace) a networked appliance (e.g. a network enabled refrigerator or clothes washer,) media player, personal digital assistant, key fob, access card, multi-function device, game system, or any other such client device. As shown, client device 1000 comprises memory 1004, processor 1002, input device 1006, display 1008, and wireless interface 1012.

Host device 1050 may be any communication device capable of providing data sharing to a client device 1000 in a fashion similar to what is described above for data sharing from various host devices to various client devices. As shown, host device 1050 includes processor 1052, memory 1054, input device 1056, display 1058, wireless interface 1062, wireless interface 1064, and baseband device 1059. Input device 1056 may include a touch screen or voice command system. User interface 300 of FIG. 3 may be provided via input device 1056. Input device 1056 may share components with display 1058.

Certain embodiments of host devices may have multiple communications interfaces. In some embodiments, as part of data sharing performed by a host device, the host device may communicate with a network using one communication interface based on a first communication protocol, and the host device may communicate with a client device using a second communication interface (different from the first communication interface) based on a second communication protocol different from the first communication protocol. Examples of such host devices may include smart phones, desktop computers, laptop computers, and other such network enabled computing devices.

Client device 1000 may communicate with host device 1050 via connection 1038. Similarly, host device 1050 may communicate with network 1090 via connection 1088. In further embodiments, client device 1000 may also create a connection with one or more other networks including network 1090. Different embodiments may implement connection 1038, connection 1088, or aspects of these connections using one or more communication protocols or technologies, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A host or client device can include wireless circuitry as part of wireless interfaces, such as wireless interface 1012, wireless interface 1062, and wireless interface 1064, that can communicate over several different types of wireless networks depending on the range required for the communication. For example, a short-range wireless transceiver (e.g., Bluetooth), medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

Connection 1038 in particular may, in certain embodiments be implemented as a peer to peer (P2P) wireless connection directly between wireless interface 1012 and wireless interface 1062. In other embodiments, connection 1038 may include multiple additional devices and sub-connections, including multiple access points, network routing connections, and communication servers.

Wireless circuitry may be used in conjunction with wireless interfaces such as wireless interfaces 1012, 1062, and 1064 to send and receive information over wireless connections such as connection. Any device described herein may additionally include conventional circuitry such as an antenna system, an RF transceiver, one or more amplifiers, a tuner, one or more oscillators, a digital signal processor, a CODEC chipset, memory, etc. to enable various wireless connections as described herein.

Wireless circuitry may be coupled to processors such as processor 1002 and processor 1052 via peripherals interfaces. Voice and data information received by wireless circuitry may be sent to one or more processors via peripheral interfaces. One or more processors such as processors 1002 and 1052 may be configurable to process various data formats for one or more application programs stored on the memory of a device.

Processors 1002 and 1052 may run various software components stored in respective memories 1004 and 1054 to perform various functions for devices 1000 and 1050. In some embodiments, the software components include an operating system, a communication module (or set of instructions), and other applications (or sets of instructions). In different embodiments, a processor may be a single integrated circuit, a set of multiple integrated circuits, or any logic hardware that may be used to implement processing functionality.

An operating system executed by a processor can be any suitable operating system. The operating system can include various procedures, sets of instructions, software components and/or drivers for controlling and managing general system tasks (e.g., memory management, storage device control, power management, etc.) and facilitates communication between various hardware and software components.

Memory as described herein, including memory 1004 and memory 1054, may be any computer-readable medium and may further be any device or medium that can store code and/or data for use by one or more processors or device components. This may include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interfaces, one or more processors, and a memory controller can be implemented on a single chip within any device described herein. In some other embodiments, they can be implemented on separate chips.

Any device described herein such as host device 1050 and client device 1000 may also include power systems for powering the various hardware components. Power systems can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, host devices and/or client devices may include various sensors. A camera may be one example of a sensor. Such camera devices along with other sensors may be considered input devices as part of input device 1056. A camera may be used to create AV data for video calls or for pictures that may be communicated via data sharing provided by a host device. In some embodiments, devices may also include various other sensors. Sensors can include accelerometers, compass, gyrometer, pressure sensors, audio sensors, light sensors, barometers, microphones, and the like. Sensors can be used to implement various device decision making and filtering, such as blur compensation for a video image in a video call, or audio filtering to assist in filtering background noise from audio information captured at one or more microphones.

In some embodiments, a client device 1000 or a host device 1050 can include a GPS receiver or other location assistance devices or modules. A device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information. Other non-GPS location/motion modules can assist in determining the current position (e.g., coordinates or other geographic location identifier) and motion of a client device 1000 or host device 1050. In addition to OPS, cellular network positioning based on "cell IDs," and WiFi positioning technology based on a WiFi networks may be used for location assistance. In some embodiments, location/motion modules may use sensor information with the above systems to determine the current position of the host device. The location information may then be used to manage data sharing connections not only for a current host device that is sharing data, but for other host devices that may be used for data sharing based on movement of client devices.

Processor 1002 and processor 1052 may execute one or more applications on their respective devices, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc. The one or more applications can also include a specific application for managing data sharing communications.

There may be other modules or sets of instructions such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem including various input devices can be coupled to a display system such as display 1008 or display 1058. These displays may be touch-sensitive and may therefore operate as displays and input devices. A touch sensitive display of client device 1000 may thus operate both as input device 1006 and display 1008. A touch sensitive display of host device 1050 may operate as display 1058 and input device 1056. The display may present visual output to the user as a graphic user interface (UI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, an I/O subsystem can include a display and user input devices such as a keyboard, mouse, and/or trackpad as part of input device(s) 1006 or input device(s) 1056. In some embodiments, I/O subsystem can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the input devices of a particular client device or host device can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, devices may include a touchpad separate from the screen for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

In addition to client devices (such as client devices 1000) and host devices (such as host device 1050) detailed above, aspects of networks (such as network 1090) and network connections (such as network connection 1038) may also be implemented using various devices and device components. For example, while in certain embodiments connection 1038 may simply be a P2P wireless connection directly between wireless interface 1012 and wireless interface 1062, in other embodiments, a communications network such as network 1090 may be used to implement connection 1038. Such a connection may include one or more access points, routers, server computers, storage devices, or other devices to implement network connection 1038. Each of these devices may include a processor, memory, and input/output structure as detailed above. Similarly, other network connections may involve cell towers, switching networks, packet processing devices, in addition to the server computers and other network infrastructure detailed above, each of which may include processing, memory, and network interface components.

Figure 11:
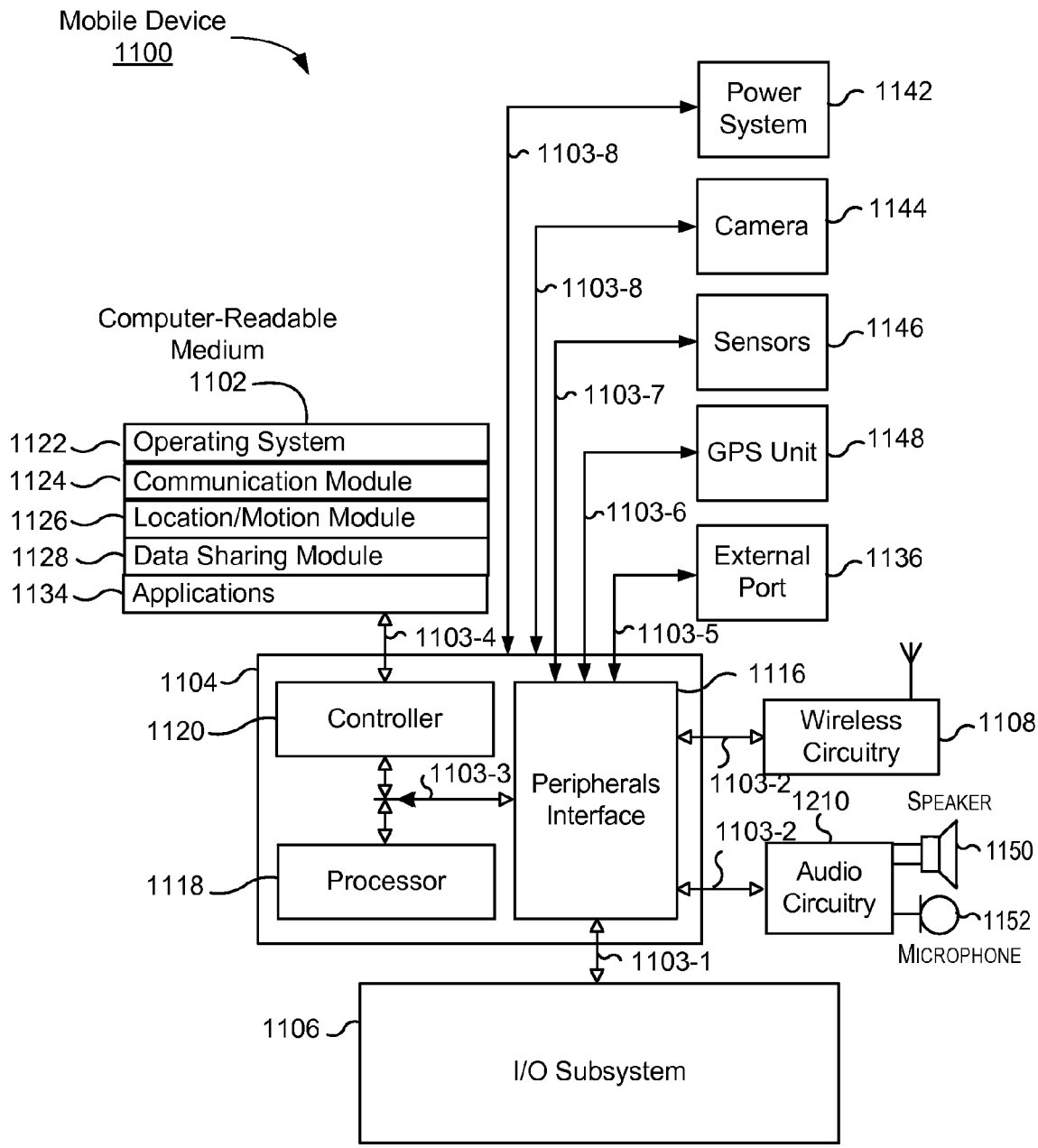
FIG. 11 is a block diagram of an example mobile device 1100, which may be a client device or a host device.

FIG. 11 is a block diagram of an example mobile device 1100, which may be a client device or a host device. Mobile device 1100 generally includes computer-readable medium 1102, a processing system 1104, an Input/Output (I/O) subsystem 1106, wireless circuitry 1108, and audio circuitry 1110 including speaker 1150 and microphone 1152. These components may be coupled by one or more communication buses or signal lines 1103. Device 1100 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items. In various embodiments, client device 1000 or host device 1050 or any other device, server, access point, network element or other computing device or element may be implemented in whole or in part using the elements of FIG. 11.

It should be apparent that the architecture shown in FIG. 11 is only one example of an architecture for mobile device 1100, and that device 1100 can have more or fewer components than shown, or a different configuration of components. The various components shown in FIG. 11 can be implemented in hardware, software, or a combination of both hardware and software, including one or more signal processing and/or application specific integrated circuits.

Wireless circuitry 1108 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 1108 can use various protocols, e.g., as described herein.

Wireless circuitry 1108 is coupled to processing system 1104 via peripherals interface 1116. Interface 1116 can include conventional components for establishing and maintaining communication between peripherals and processing system 1104. Voice and data information received by wireless circuitry 1108 (e.g., in speech recognition or voice command applications) is sent to one or more processors 1118 via peripherals interface 1116. One or more processors 1118 are configurable to process various data formats for one or more application programs 1134 stored on medium 1102.

Peripherals interface 1116 couple the input and output peripherals of the device to processor 1118 and computer-readable medium 1102. One or more processors 1118 communicate with computer-readable medium 1102 via a controller 1120. Computer-readable medium 1102 can be any device or medium that can store code and/or data for use by one or more processors 1118. Medium 1102 can include a memory hierarchy, including cache, main memory and secondary memory.

Mobile device 1100 also includes a power system 1142 for powering the various hardware components. Power system 1142 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, mobile device 1100 includes a camera 1144. In some embodiments, mobile device 1100 includes sensors 1146. Sensors can include accelerometers, compass, gyrometer, pressure sensors, audio sensors, light sensors, barometers, and the like. Sensors 1146 can be used to sense location aspects, such as auditory or light signatures of a location.

In some embodiments, mobile device 1100 can include a GPS receiver, sometimes referred to as a GPS unit 1148. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1118 run various software components stored in medium 1102 to perform various functions for device 1100. In some embodiments, the software components include an operating system 1122, a communication module (or set of instructions) 1124, a location module (or set of instructions) 1126, a data sharing module 1128, and other applications (or set of instructions) 1134, such as a car locator app and a navigation app.

Operating system 1122 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1124 facilitates communication with other devices over one or more external ports 1136 or via wireless circuitry 1108 and includes various software components for handling data received from wireless circuitry 1108 and/or external port 1136. External port 1136 (e.g., USB, FireWire, Lightning connector, 60-pin connector, etc.) is adapted for coupling directly to other devices or indirectly over a network (e.g., the Internet, wireless LAN, etc.).

Location/motion module 1126 can assist in determining the current position (e.g., coordinates or other geographic location identifier) and motion of mobile device 1100. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1126 receives data from GPS unit 1148 and analyzes the signals to determine the current position of the mobile device. In some embodiments, location/motion module 1126 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1108 and is passed to location/motion module 1126. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for mobile device 1100 based on the position coordinates of the corresponding transmitters. Regardless of the specific location technology used, location/motion module 1126 receives information from which a location fix can be derived, interprets that information, and returns location information, such as geographic coordinates, latitude/longitude, or other location fix data.

Data sharing module 1128 can include user interface 300 of FIG. 3 when mobile device 1100 acts as a host device. When mobile device 1100 acts as a client device, data sharing module can include mechanisms for the user to request a communications link to a host device or for automatically trying to connect with a host device. In such a case, mobile device 1100 can send a client identifier to a host device.

The one or more applications 1134 on the mobile device can include any applications installed on the device 1100, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1106 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1106 can include a display and user input devices such as a keyboard, mouse, and/or trackpad. In some embodiments, I/O subsystem 1106 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1102) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1100 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or ail of the operations described herein can be performed using an application executing on the user's mobile device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Although the invention has been described with respect to specific embodiments, it will be appreciated that the invention is intended to cover all modifications and equivalents within the scope of the following claims.

What is claimed is:

1. A method of using a host device associated with a first user to provide network communications to a network for a client device associated with a second user different from the first user, the method comprising:
at the host device comprising a first wireless interface, a second wireless interface, an input module, and a memory storing one or more sharing parameters for the host device to provide network access to client devices not associated with the first user:
receiving a network-access request from the client device associated with the second user via the second wireless interface, wherein the network-access request includes a client identifier identifying the client device;
sending the client identifier to an authentication server via the first wireless interface;
receiving an authentication response from the authentication server, the authentication response providing an indication that the client device is registered with the authentication server; and
responsive to the authentication response, providing network access to the client device by:
communicating data between the client device via the second wireless interface; and
communicating the data with the network via the first wireless interface.

2. The method of claim 1, wherein the one or more sharing parameters include a selection of data sharing being turned on, a bandwidth limit above which network access is restricted, and a battery level below which network access is restricted.

3. The method of claim 1, further comprising, at the host device:
sending a host identifier of the host device to the authentication server to verify that the host device is registered with the authentication server;
receiving an additional authentication response and forwarding the additional authentication response to the client device, the additional authentication response providing an indication to the client device that the host device is registered with the authentication server.

4. The method of claim 1, wherein the network-access request further includes an authentication credential, the method further comprising, at the host device:
sending the authentication credential to the authentication server, wherein the authentication response indicates that the client device is registered with the authentication server when the client identifier and the authentication credential matches values stored at the authentication server.

5. The method of claim 1, further comprising, at the host device:
receiving an additional response from the authentication server, prior to providing network access to the client device, wherein the additional response includes information about incentives available to the host device for sharing network access; and
determining whether to provide network access according to the one or more sharing parameters based on the information about available incentives.

6. The method of claim 1, further comprising, at the host device:
identifying a resource usage associated with the data communicated for the client device; and
communicating the resource usage to an incentive server for obtaining an incentive for the first user; and
receiving, from the incentive server via the first wireless interface, a notification of the incentive associated with the resource usage, after communicating the resource usage to the incentive server.

7. A host device associated with a first user for providing network communications for one or more client devices associated with one or more other users different from the first user, the host device comprising:
a first wireless interface;
a second wireless interface;
a memory storing a threshold value for a sharing parameter that controls providing of network access by the host device to client devices not associated with the first user, wherein the sharing parameter corresponds to a resource usage associated with providing the network access to the one or more client devices; and
one or more processors configured to:
provide the network access to the one or more client devices using the first wireless interface to communicate with a network and using the second wireless interface to communicate with the one or more client devices;
monitor the resource usage associated with providing the network access;
determine that the resource usage associated with providing network access has exceeded the threshold value; and
restrict the network access to the one or more client devices based on the determining that the resource usage has exceeded the threshold value.

8. The host device of claim 7, wherein the one or more processors are further configured to:
provide a user interface comprising the sharing parameter that controls providing of network access by the host device to client devices not associated with the first user; and
receive, via the user interface, a sharing input that specifies the threshold value for the resource usage, wherein the user interface comprises a plurality of sharing parameters, each providing a different control of the providing of network access by the host device to client devices not associated with the first user.

9. The host device of claim 7, wherein the sharing parameter specifies when the host device is available to provide network access to client devices not associated with the first user based on the resource usage.

10. The host device of claim 7, wherein the sharing parameter corresponds to a percentage of bandwidth available to the host device via the network.

11. The host device of claim 10, wherein restricting the network access includes reducing an amount of bandwidth available for sharing.

12. The host device of claim 7, wherein the sharing parameter corresponds to a battery level of the host device below which network access is restricted.

13. The host device of claim 12, wherein restricting the network access includes reducing an amount of bandwidth available for sharing to a first bandwidth when the battery level is below the threshold value.

14. The host device of claim 13, further comprising, at the host device:
receiving, via a user interface, a subsequent threshold value for the battery level, the subsequent threshold value being less than the threshold value; and
reducing an amount of bandwidth available for sharing to a second bandwidth when the battery level is below the threshold value, the second bandwidth being less than the first bandwidth.

15. The host device of claim 7, wherein the one or more processors are further configured to:
provide network access to a first client device while providing network access to a second client device, wherein the determining that the resource usage associated with providing network access has exceeded the threshold value is based on the network access provided to the first client device and the second client device.

16. A method of using a client device associated with a second user to access a network via a host device associated with a first user that is different than the second user, the method comprising:
at the client device comprising a wireless interface:
establishing, via the wireless interface, a network-sharing communication link with the host device, wherein establishing the network-sharing communication link comprises:
sending, to the host device, a client identifier associated with the client device;
receiving, from the host device, an indication that the host device is available for the network-sharing communication link for providing network access to the network; and
receiving, from an authentication server via the host device, an authentication response from the authentication server, the authentication response providing an indication that the host device is registered with the authentication server, wherein the client identifier is usable to determine that the client device is registered with the authentication server; and
communicating, via the network-sharing communication link, data with the network.

17. The method of claim 16, further comprising, at the client device:
registering the client device with the authentication server prior to establishing the network-sharing communication link.

18. The method of claim 17, further comprising, at the client device:
receiving the client identifier from the authentication server as part of a registration of the client device with the authentication server.

19. The method of claim 16, wherein the authentication response is encrypted by the authentication server and decrypted by the client device.

20. The method of claim 19, further comprising, at the client device:
verifying the authentication response by identifying a received shared secret in the decrypted authentication response; and
comparing the received shared secret to a stored shared secret that is stored at the client device.

21. The host device of claim 7, wherein the sharing parameter corresponds to a percentage of bandwidth available for sharing with the client devices not associated with the first user.

* * * * *